United States Patent [19]
Sawada et al.

[11] Patent Number: 6,079,799
[45] Date of Patent: Jun. 27, 2000

[54] BRAKE SYSTEM

[75] Inventors: Mamoru Sawada, Yokkaichi; Kazuya Maki, Nagoya; Hiroaki Niino, Toyota; Masaki Tate; Yuzo Imoto, both of Chita-gun, all of Japan

[73] Assignee: Denso Corporation, Kariya, Japan

[21] Appl. No.: 08/997,472

[22] Filed: Dec. 23, 1997

[30] Foreign Application Priority Data

| Dec. 24, 1996 | [JP] | Japan | 8-343613 |
| Jul. 2, 1997 | [JP] | Japan | 9-177401 |
| Nov. 5, 1997 | [JP] | Japan | 9-302910 |

[51] Int. Cl.$^7$ .................................... B60T 8/48
[52] U.S. Cl. ................. 303/146; 303/10; 303/113.1; 303/113.2
[58] Field of Search ................. 303/146, 147, 303/148, 140, 113.1–119.3, 139, 10–12; 701/72; 180/197

[56] References Cited

U.S. PATENT DOCUMENTS

| 5,013,094 | 5/1991 | Nishii et al. . | |
| 5,206,808 | 4/1993 | Inoue et al. | 303/146 |
| 5,267,783 | 12/1993 | Inoue et al. | 303/146 |
| 5,362,140 | 11/1994 | Burgdorf . | |
| 5,492,394 | 2/1996 | Kusano et al. . | |
| 5,494,345 | 2/1996 | Inagaki et al. . | |
| 5,560,690 | 10/1996 | Hattori et al. | 303/146 |
| 5,640,324 | 6/1997 | Inagaki | 701/72 |
| 5,645,326 | 7/1997 | Sano | 303/140 |
| 5,709,439 | 1/1998 | Monzaki | 303/146 |
| 5,722,743 | 3/1998 | Sano | 303/146 |
| 5,727,853 | 3/1998 | Monzaki | 303/146 |
| 5,735,582 | 4/1998 | Eith et al. . | |
| 5,782,543 | 7/1998 | Monzaki et al. | 303/140 |
| 5,839,799 | 11/1998 | Fukada | 303/146 |

FOREIGN PATENT DOCUMENTS

| 0 566 344 | 10/1993 | European Pat. Off. . |
| 41 25 843 | 2/1993 | Germany . |
| 42 13 710 | 10/1993 | Germany . |
| 42 22 954 | 1/1994 | Germany . |
| 4-57476 | 5/1992 | Japan . |
| 5-270381 | 10/1993 | Japan . |
| 6-87426 | 3/1994 | Japan . |
| 8-20322 | 1/1996 | Japan . |
| 2 193 771 | 2/1988 | United Kingdom . |
| 2 297 134 | 7/1996 | United Kingdom . |
| 92/17357 | 10/1992 | WIPO . |
| 96/15926 | 5/1996 | WIPO . |

*Primary Examiner*—Douglas C. Butler
*Attorney, Agent, or Firm*—Pillsbury Madison & Sutro LLP

[57] ABSTRACT

A brake system has wheel cylinders for producing a braking force in wheels using pressurized brake fluid transmitted through a main conduit from a master cylinder, a reservoir for storing brake fluid, a sideslip preventing device for when a sideslip state of the vehicle is detected supplying brake fluid to the wheel cylinder corresponding to a sideslip controlled wheel and producing a braking force in the sideslip controlled wheel, a first conduit used for supplying brake fluid from the reservoir to the wheel cylinders by the pump and a first valve for switching this first conduit between an open state and a closed state. The sideslip preventing device, when the sideslip state is detected during non-braking of the vehicle, makes the first valve open-state and thereby conducts supply of brake fluid through the first conduit from the reservoir to the wheel cylinder by a pump. When the sideslip state is detected during braking of the vehicle, the sideslip preventing device makes the first valve device closed-state and thereby prohibits supply of brake fluid from the reservoir to the wheel cylinder.

17 Claims, 17 Drawing Sheets

FIG. 5

| | DIFFERENTIAL VALVE 6 | FIRST CONTROL VALVE 14 | SECOND CONTROL VALVE 15 | DIFFERENTIAL VALVE 36 | REAR CONTROL VALVE 44 | THIRD, FOURTH INCREASE VALVES 37, 38 | THIRD, FOURTH DECREASE VALVES 41, 42 |
|---|---|---|---|---|---|---|---|
| (A) PULSE INCREASING | OFF | OFF | ON | ON | ON | DUTY | OFF |
| (B) HOLDING | OFF | OFF | ON | ON | ON | ON | OFF |
| (C) PULSE DECREASING | OFF | OFF | ON | ON | ON | ON | DUTY |

FIG. 8

|   | DIFFERENTIAL VALVE 6 | FIRST CONTROL VALVE 14 | SECOND CONTROL VALVE 15 | DIFFERENTIAL VALVE 36 | REAR CONTROL VALVE 44 | FIRST or SECOND INCREASE VALVES 7, 8 | FIRST or SECOND DECREASE VALVES 11, 12 |
|---|---|---|---|---|---|---|---|
| (A) PULSE INCREASING | ON | ON | ON | ON | ON | DUTY | OFF |
| (B) PULSE DECREASING | ON | ON | ON | ON | ON | ON | DUTY |

| | DIFFERENTIAL VALVE 6.36 | FIRST CONTROL VALVE 14 | SECOND CONTROL VALVE 15 | INCREASE VALVE 8 | DECREASE VALVE 12 |
|---|---|---|---|---|---|
| (A) | ON | ON | ON | ON | OFF |
| (B) | ON | ON | DUTY | DUTY | OFF |
| (C) | ON | ON | OFF | ON | OFF |
| (D) | ON | ON | OFF | ON | DUTY |

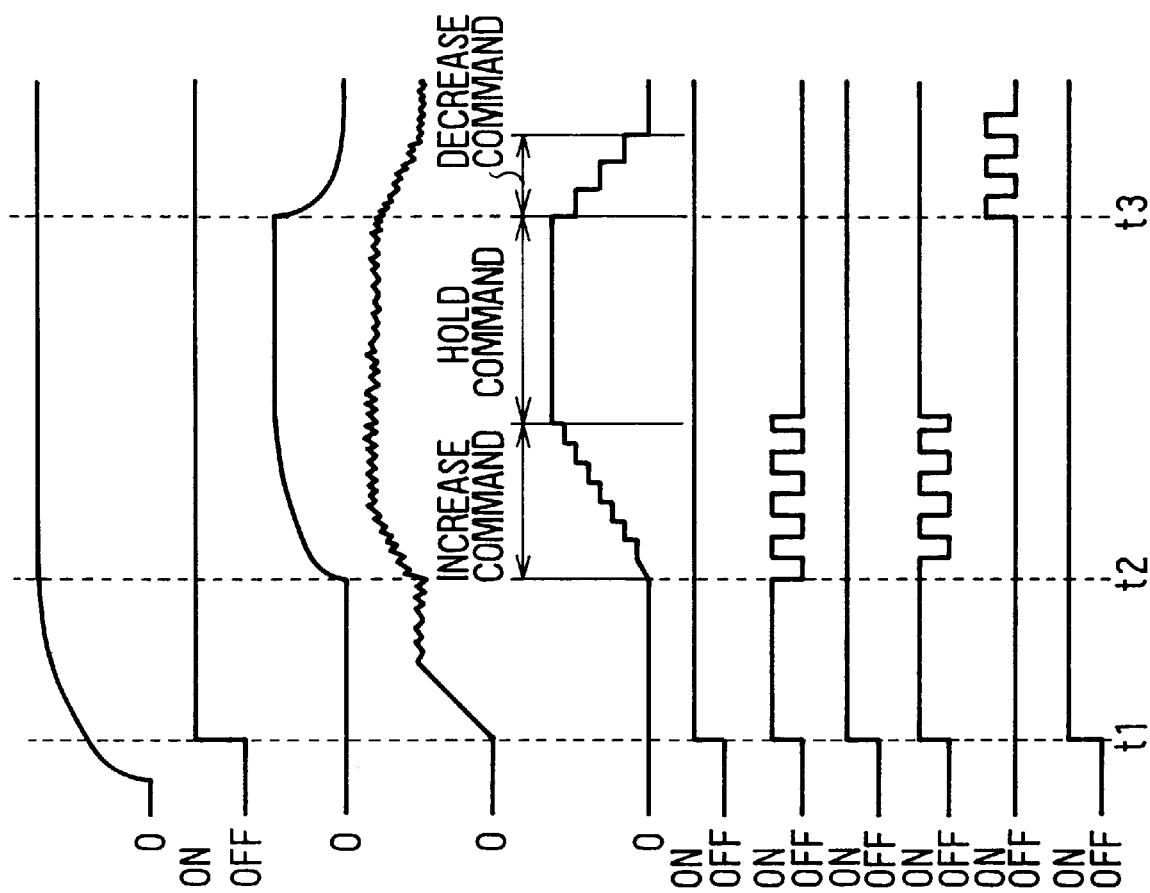

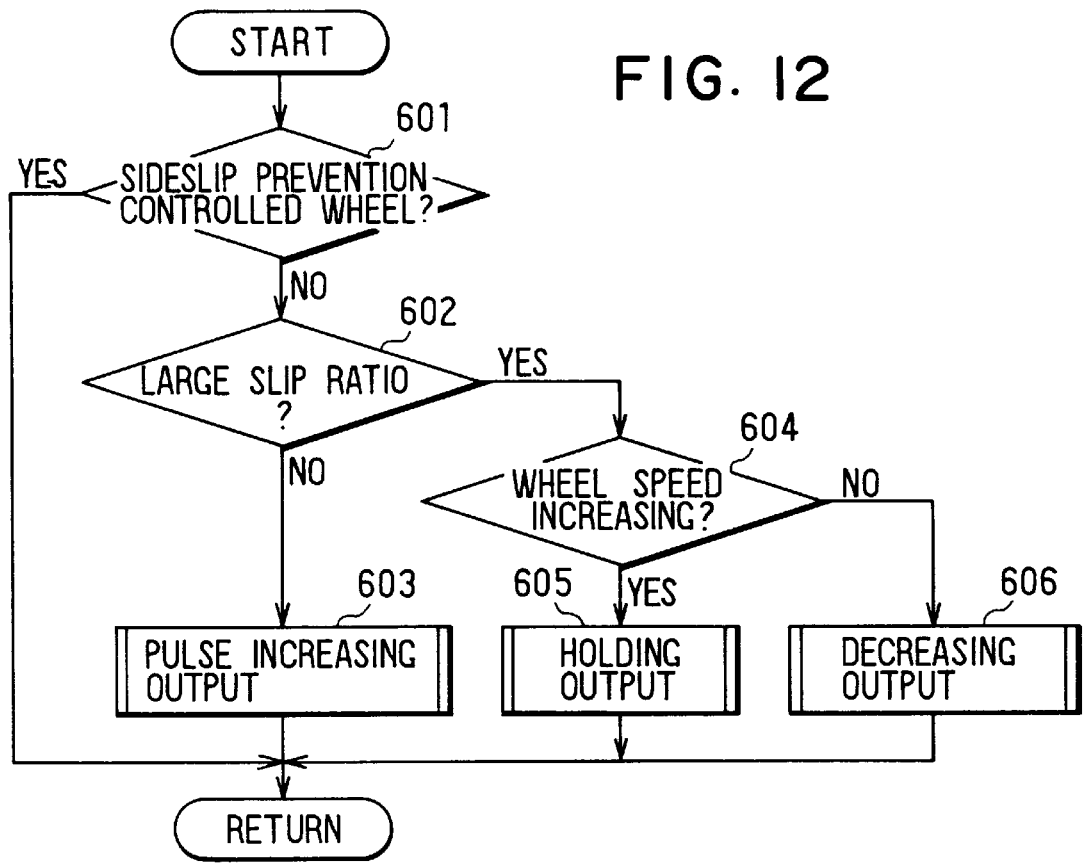
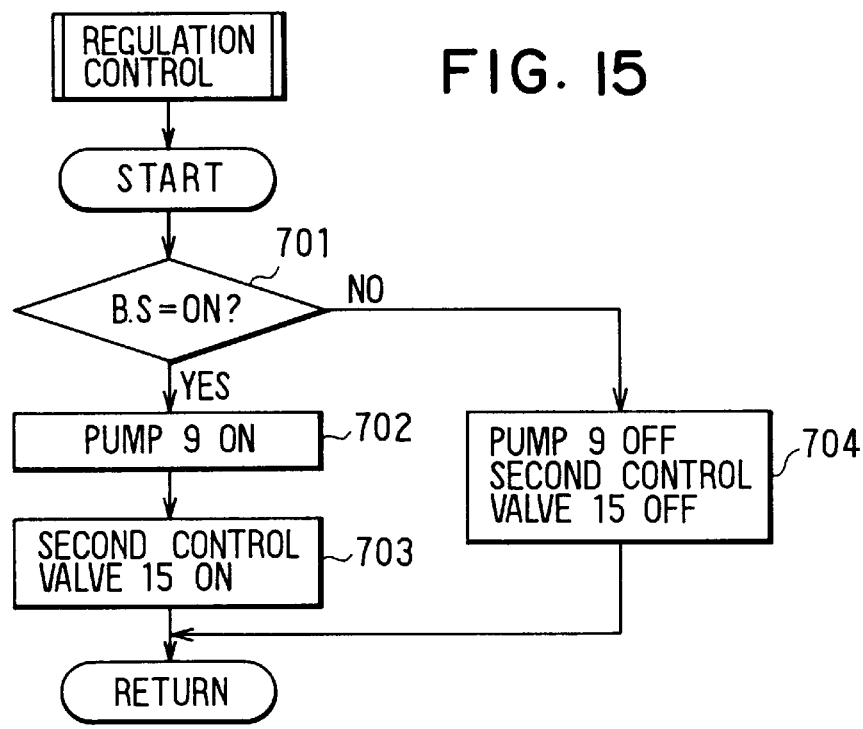

FIG. 13

| | DIFFERENTIAL VALVE 6 | FIRST CONTROL VALVE 14 | SECOND CONTROL VALVE 15 | DIFFERENTIAL VALVE 36 | REAR CONTROL VALVE 44 | FIRST TO FOURTH INCREASE VALVES 7, 8, 37, 38 | FIRST TO FOURTH DECREASE VALVES 11, 12, 41, 42 |
|---|---|---|---|---|---|---|---|
| (A) PULSE INCREASING | OFF | OFF | OFF | OFF | OFF | DUTY | OFF |
| (B) HOLDING | OFF | OFF | OFF | OFF | OFF | ON | OFF |
| (C) PULSE DECREASING | OFF | OFF | OFF | OFF | OFF | ON | ON |

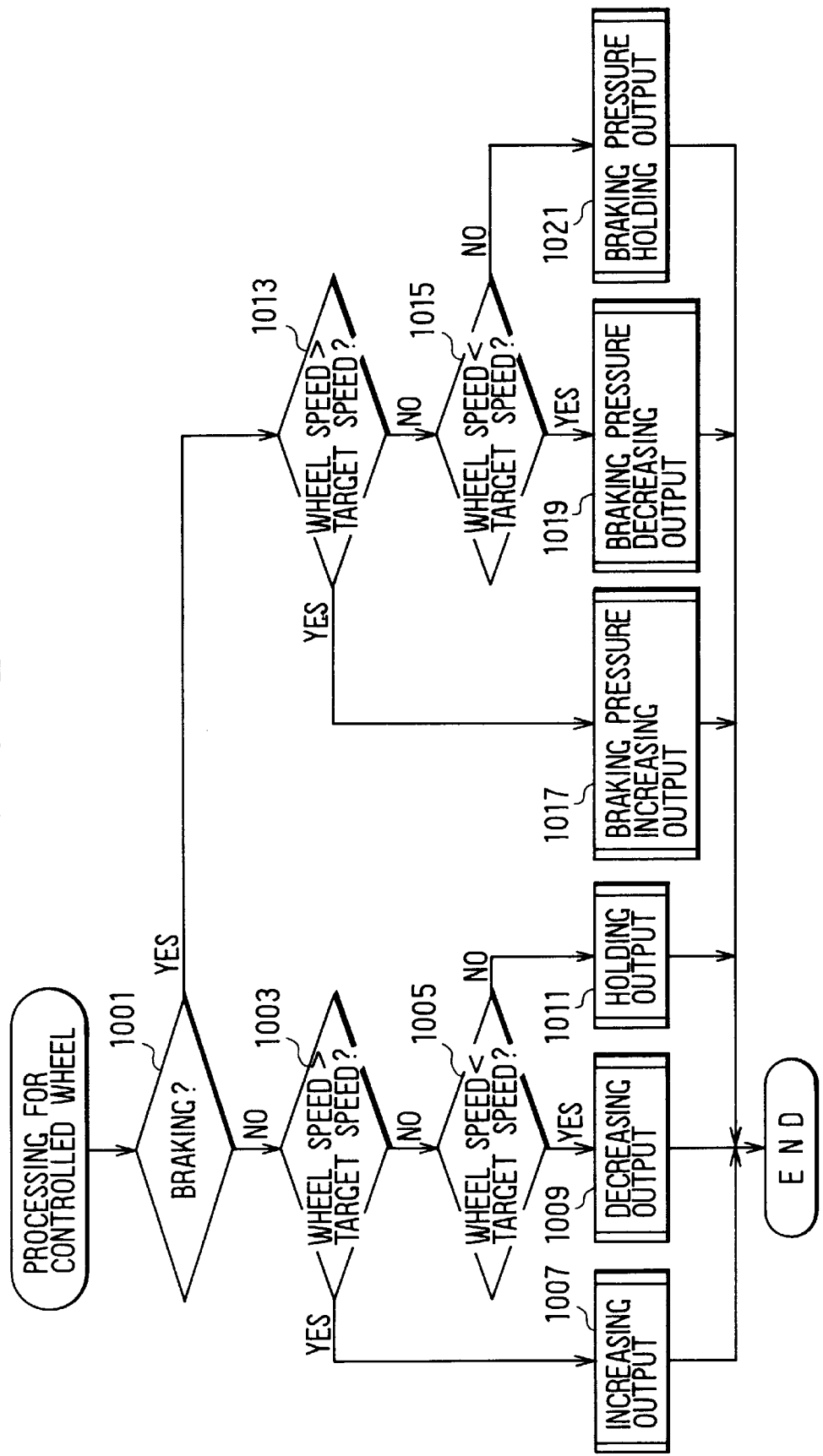

FIG. 21

| | INCREASE CONTROL VALVE | DECREASE CONTROL VALVE | FIRST CONTROL VALVE | SECOND CONTROL VALVE |
|---|---|---|---|---|
| (A) INCREASING OUTPUT | OPEN | CLOSE | CLOSE | OPEN |
| (B) DECREASING OUTPUT | CLOSE | OPEN | OPEN | CLOSE |
| (C) HOLDING OUTPUT | CLOSE | CLOSE | CLOSE | CLOSE |
| (D) BRAKING PRESSURE INCREASING OUTPUT | OPEN | CLOSE | OPEN | CLOSE |
| (E) BRAKING PRESSURE DECREASING OUTPUT | CLOSE | OPEN | OPEN | CLOSE |
| (F) BRAKING PRESSURE HOLDING OUTPUT | CLOSE | CLOSE | OPEN | CLOSE |

BRAKE SYSTEM

CROSS REFERENCE TO RELATED APPLICATIONS

This application is based upon and claims the benefit of priority of Japanese Patent Applications No. H. 8-346313 filed on Dec. 24, 1996, No. H. 9-177401 filed on Jul. 2, 1997, and No. H. 9-302910 filed on Nov. 5, 1997, the contents of which are incorporated herein by reference.

BACKGROUND OF THE INVENTION

1. Field of the Invention

This invention relates to a vehicle brake system having a sideslip prevention system.

2. Description of Related Art

Conventionally, brake systems having a sideslip prevention system are known in the art. As an example of one such brake system, see the brake system shown in Japanese Patent Application Laid-Open No. 7-117654. A few fundamental components of a brake system include a master cylinder which produces a brake fluid pressure corresponding to a force created when a driver steps on the brake pedal and a low-pressure reservoir having an essentially atmospheric pressure which provides brake fluid to a self-supplying pump. Also, most brake systems have a plurality of main conduits for transmitting a master cylinder pressure produced in the master cylinder to wheel cylinders. Pressure increase control valves are provided in each main conduit for controlling the increase of pressure applied to the wheel cylinders. Also provided in each main conduit are pressure decrease control valves that control the reduction of pressure in the wheel cylinders. The common brake system has a conduit which connects the self-supplying pump to a brake fluid delivery section between the pressure increase control valve and the pressure decrease control valve to supply brake fluid from the self-supplying pump, and a control valve for cutting off the master cylinder from the brake fluid delivery section when the pump draws and delivers brake fluid.

Brake systems have been modified to prevent or control sideslip. In sideslip prevention control, or trace characteristic increase control, when not braking, the self-supplying pump draws brake fluid directly from the low-pressure reservoir and delivers the brake fluid toward the wheel cylinders, thereby increasing the wheel cylinder pressure. When the driver begins to brake while in the process of sideslip prevention control, first a master cylinder pressure resulting from the pedal operation is applied to the wheel cylinders. After that, the master cylinder and the brake fluid delivery section are cut off by the control valve. As a result, the master cylinder pressure is sealed into the conduits on the wheel cylinder side. In this state, brake fluid is pumped to a wheel cylinder of a control object wheel.

However, in the above-described brake system, the brake fluid pressure formed in the conduits on the wheel cylinder side may become larger than the pressure formed by the brake fluid supplied from the port of the master cylinder in response to the brake pedal operation. For example, when sideslip control is carried out from the application of the brake pedal, a pressure resulting from a brake fluid amount supplied from the reservoir is added to the master cylinder pressure produced as a result of applying the brake pedal. Because of the additional pressure from the reservoir, the wheel cylinder pressure is higher than the master cylinder pressure.

In this case, after control termination counterflow of brake fluid accompanying brake fluid from the reservoir is carried out simultaneously, a large brake fluid pressure is applied to the port or seal parts of the master cylinder. Consequently, the performance characteristics of the master cylinder part or seal deteriorates.

Also, when rising brake fluid pressure inside the master cylinder due to brake fluid counterflowing occurs simultaneously with when the driver steps on the brake, the brake pedal may become difficult to depress.

Some vehicle brake systems have two piping systems in order to have both a sideslip prevention system and an anti-lock brake system as shown in Japanese Patent Application Laid-Open No. 6-87426. In this type of brake system, two pumps are provided to carry out sideslip prevention control and for supplying brake fluid from a reservoir to a first piping system and a second piping system. Braking forces are produced in the controlled wheels by driving these two pumps.

However, using separate pumps for a first piping system and a second piping system increases the complexity of the piping arrangement. Therefore, there is a demand for the ability to carry out sideslip prevention control with a single pump. In this case, applying braking forces to both the wheels in the first piping system and the wheels in the second piping system by means of a pump supplying brake fluid in a master reservoir to the first piping system is conceivable. That is, when in sideslip prevention control, the system increases the brake fluid pressure of the first piping system by delivering brake fluid supplied from the master reservoir to the first piping system, whereby a braking force is produced in the controlled wheel. If the controlled wheel is on the second piping system during sideslip prevention control, brake fluid supplied from the master reservoir is delivered to the first piping system. Delivering brake fluid to the first piping system increases the brake fluid pressure of a primary chamber of a master cylinder. The brake fluid pressure of a secondary chamber of the master cylinder is also increased due to the pressure increase within the primary chamber, whereby the brake fluid pressure of the second piping system is increased to produce a braking force in the controlled wheel.

However, because the primary chamber and the master reservoir are connected through an orifice, even when the primary chamber is increased in pressure there is a limit to that pressure increase. Consequently, even if the secondary chamber is increased in pressure along with pressure increase of the primary chamber, it is necessary to increase the brake fluid pressure in the second piping system by means of a pump for ABS control or the like thereafter. This deficiency increases the complexity of such a braking system.

SUMMARY OF THE INVENTION

The present invention was made in view of the deficiencies in the related art mentioned above. It is a first object of the invention to provide a brake system wherein during sideslip prevention control, the responsiveness to sideslip prevent control is good and the problems caused by excess brake fluid supplied from the reservoir are eliminated.

A second object of the present invention is to make it possible to carry out sideslip prevention control using only one pump of one piping system and to simplify the piping construction.

To achieve the above-mentioned first object, a brake system of the present invention comprises a wheel braking force producing device for producing a braking force in wheels using pressurized brake fluid transmitted through a main conduit from a brake fluid pressure producing source, a low-pressure reservoir for storing brake fluid, and a sideslip preventing device. When a sideslip state of the vehicle is detected, the sideslip preventing device supplies brake fluid from the brake fluid pressure producing source to the wheel braking force producing device corresponding to a controlled wheel. This supply of brake fluid produces a braking force in the controlled wheel. The brake system of the present invention further comprises a first conduit that supplies brake fluid from the low-pressure reservoir to the wheel braking force producing device and a first valve device that switches this first conduit between an open state and a closed stated.

When the sideslip state is detected during non-braking of the vehicle, the sideslip preventing device opens the first valve device to thereby supply brake fluid through the first conduit from the reservoir to the wheel braking force producing device corresponding to the controlled wheel. When the sideslip state is detected during braking, the sideslip preventing device closes the first valve device to prevent the reservoir from supplying brake fluid to the wheel braking force producing device corresponding to the controlled wheel.

Using this approach, the responsiveness of the sideslip prevention control is good because brake fluid is drawn from the reservoir. Further, during braking, when a brake fluid pressure is produced in the brake fluid pressure producing source, it is possible to prevent brake fluid from being drawn from the reservoir, thereby avoiding drawing excess brake fluid from the reservoir. The arrangement according to the present invention prevents excess brake fluid from counterflowing to the brake fluid pressure producing source, which protects the brake fluid pressure producing source and makes it easier for the driver to depress the brake pedal.

The present invention may have a pressure detecting device for detecting a brake fluid pressure in the brake fluid pressure producing source. The sideslip preventing device, when the pressure detected by the pressure detecting device is smaller than a predetermined pressure, and even if the sideslip state has been detected during braking, may open the first valve device and supply brake fluid through the first conduit. In this manner, when the pressure in the brake fluid pressure producing source is smaller than a predetermined pressure, it is not possible to supply enough brake fluid using only the brake fluid pressure producing source. Therefore, even during braking, when the pressure in the brake fluid pressure producing source is smaller than the predetermined pressure, supplying brake fluid from the reservoir side improves the responsiveness of sideslip prevention control.

The present invention may have a second conduit which supplies brake fluid from the brake fluid pressure producing source to the wheel braking force producing device and a pump for delivering brake fluid supplied through the first conduit and the second conduit toward the wheel braking force producing device. By providing the pump which can deliver brake fluid supplied through both the first conduit and the second conduit toward the wheel braking force producing device, it is possible to use the same pump required for drawing brake fluid from each of these. This arrangement decreases the complexity of the system and reduces production costs.

The present invention may have an accelerating slip preventing device for producing a braking force in the driving wheels when an accelerating slip state of the vehicle is detected while not braking. This accelerating slip preventing device opens the first valve device and the second valve device and supplies brake fluid, which is supplied from the reservoir through the first conduit, from the pump by way of the second valve device to the brake fluid pressure producing source. It is to be noted that the second valve device is disposed between the brake fluid pressure producing source and the wheel braking force producing device. That is, when the brake fluid pressure in the brake fluid pressure producing source is small, it is not easy for the pump to draw brake fluid from this brake fluid pressure producing source. Therefore, by supplying brake fluid from inside the reservoir to the brake fluid pressure producing source by means of the pump, it is possible to increase the brake fluid pressure in the brake fluid pressure producing source. As a result, this facilitates drawing brake fluid from the brake fluid pressure producing source.

In the present invention, brake fluid that the pump delivers may be supplied to a first chamber of the brake fluid pressure producing source. A first brake fluid pressure in the first chamber can be regulated on the basis of this supplied brake fluid. By supplying brake fluid that the pump delivers to the first chamber of the brake fluid pressure producing source in this way, it is possible to regulate the first brake fluid pressure of the first chamber. As a result, a second brake fluid pressure may be produced which is equal to the first brake fluid pressure in a second chamber of the brake fluid pressure producing source. On the basis of this second brake fluid pressure, a brake fluid pressure in a second wheel cylinder through another piping system may be provided.

With this arrangement, because a brake fluid pressure in the second wheel cylinder is produced even when the brake pedal is not depressed, it is possible to execute automatic braking during non-braking.

Also, a first orifice connected to the first chamber of the brake fluid pressure producing source may be provided in the present invention. If the first brake fluid pressure in the first chamber is low when compared to the force with which the driver steps on the brake pedal, the first orifice closes. to the pedal stepping force the first brake fluid pressure is high. The first orifice opens when the first brake fluid pressure is high. As a result, it is possible to regulate the first brake fluid pressure to a pressure corresponding to the pedal stepping force.

In this case, when the driver applies a small amount of pressure to the brake pedal, it is possible to produce a brake fluid pressure in the first and second wheel cylinders by means of the first brake fluid pressure generated in the first chamber. Therefore, the pedal stroke amount may be shortened.

When a master cylinder is used as the brake fluid pressure producing source, opening and closing of the first orifice is carried out by a master piston provided in the master cylinder.

The present invention may have a pressure detecting device for detecting a brake fluid pressure in the brake fluid pressure producing source. On the basis of a detection result of the pressure detecting device an amount of brake fluid supplied to the first chamber may be duty-controlled. If the brake fluid amount supplied to the first chamber is duty-controlled on the basis of the detection result of the pressure detecting device in this way, it is possible to carry out good brake operation on the basis of the state of the vehicle and the like.

In the present invention, particularly during automatic braking when the driver has not initiated a braking operation, brake fluid can be supplied to the first chamber and/or the second chamber by a brake fluid supplying device such as a pump. A brake fluid pressure is simultaneously applied to the wheel cylinder side to produce a wheel braking force. Because at this time a pressure-regulating action is carried out so that the first chamber and the second chamber have the same brake-fluid pressure, it is possible to apply a substantially equal brake fluid pressure to the first and second wheel cylinders. The first chamber and the second chamber are for example a primary chamber and a secondary chamber in a master cylinder.

The primary chamber and secondary chamber of a master cylinder may be provided for first and second brake piping systems. Along with vehicle braking corresponding to a pedal operation of a driver, brake fluid is drawn by a pump and force-fed to the first brake piping system including the primary chamber. As a result, the brake fluid pressure of the primary chamber increases and the primary chamber enlarges so that the pedal stepping force of the driver and the pressure of the primary chamber become balanced. Along with this enlarging of the primary chamber an operation of whether or not brake fluid is allowed to escape through a passage leading to a master reservoir arises. At this time the primary chamber and the secondary chamber become substantially the same pressure and also a brake fluid pressure equal to the first brake piping system is applied to the second brake piping system. Along with enlargement of the primary chamber, the pedal stepping stroke for the driver shortens.

To achieve the above-mentioned second object, the present invention comprises a pump for drawing brake fluid from a reservoir and delivering the brake fluid to a first conduit connecting a primary chamber of a brake fluid pressure producing source and a first wheel braking force generating device and a connection control valve for controlling the open/closed state of a connecting passage connecting the primary chamber and the reservoir. When a braking force of a controlled wheel is produced according to a sideslip state by means of a first wheel braking force producing device, second pressure increasing control valve disposed in a second conduit connecting a secondary chamber of the brake fluid pressure producing source and a second wheel braking force producing device is closed. As a result, brake fluid is supplied to first wheel braking force producing device without brake fluid supplied to the second wheel braking force producing device. When a braking force in the controlled wheel is produced by means of the second wheel braking force producing device, the connection control valve and the first pressure increase control valve are closed. As a result, brake fluid is supplied only to the second wheel braking force producing device.

By providing a connection control valve in a passage connecting the reservoir and the primary chamber of the brake fluid pressure producing device, even when producing a braking force of the controlled wheel by means of the second wheel braking force producing device, it is possible to produce a braking force in the controlled wheel by driving the pump and thereby carry out sideslip prevention control. That is, when brake fluid is delivered by the pump to the first conduit, because it is possible to increase the brake fluid pressure in the primary chamber by means of this delivered brake fluid, along with the pressure increase of this primary chamber, the brake fluid pressure of the secondary chamber increases. Consequently, it is possible to supply brake fluid to the second wheel braking force producing device according to the increase of this brake fluid pressure. Therefore, the second wheel braking force producing device can produce a braking force in the controlled wheel. By this means, it is possible to carry out sideslip prevention control only by driving a single pump and it is possible to achieve simplification of the piping construction.

The present invention may comprise a pressure detecting device for detecting a brake fluid pressure in at least one of the first conduit and the second conduit. When the brake fluid pressure detected by the pressure detecting device is higher than a brake fluid pressure used for sideslip prevention control, the system determines that the driver applied the brake. Therefore, a braking force is produced in the controlled wheel (51) on the basis of a brake fluid pressure in the brake fluid pressure producing device which is increased according to a braking operation of the driver.

Because the first conduit and the second conduit connect the first and second wheel braking force producing devices, if it is determined whether or not the braking operation is being made according to the brake fluid pressure detected in these conduits, it is possible to carry out sideslip prevention control corresponding to the brake fluid pressure of the first and second wheel braking force producing devices. That is, because the brake fluid pressure of the first and second wheel braking force producing devices is related to the road surface $\mu$ in sideslip prevention control, it is possible to carry out sideslip prevention control corresponding to the road surface $\mu$. If a braking force can be produced in the controlled wheel with the brake fluid pressure in the brake fluid pressure producing device, when the braking operation is detected it is possible to produce a braking force in each wheel corresponding to the braking operation of the driver.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 5 is a view showing solenoid drive patterns selected in TRC control processing;

FIG. 8 is a view showing a solenoid drive pattern selected in sideslip prevention control;

FIGS. 11A, 11B, 11C, 11D, 11E, 11F, 11G, 11H, 11I, 11J, and 11K are time charts illustrating the timing of sideslip prevention control processing;

FIG. 12 is a flow chart in ABS control processing;

FIG. 13 is a view showing solenoid drive patterns selected in ABS control;

FIG. 15 is a flow chart of when a regulating action is executed;

FIG. 20 is a flow chart showing processing for a controlled wheel in sideslip prevention control; and FIG. 21 is a view showing solenoid drive patterns selected in sideslip prevention control.

DETAILED DESCRIPTION OF THE PREFERRED EMBODIMENTS

Figure 1:
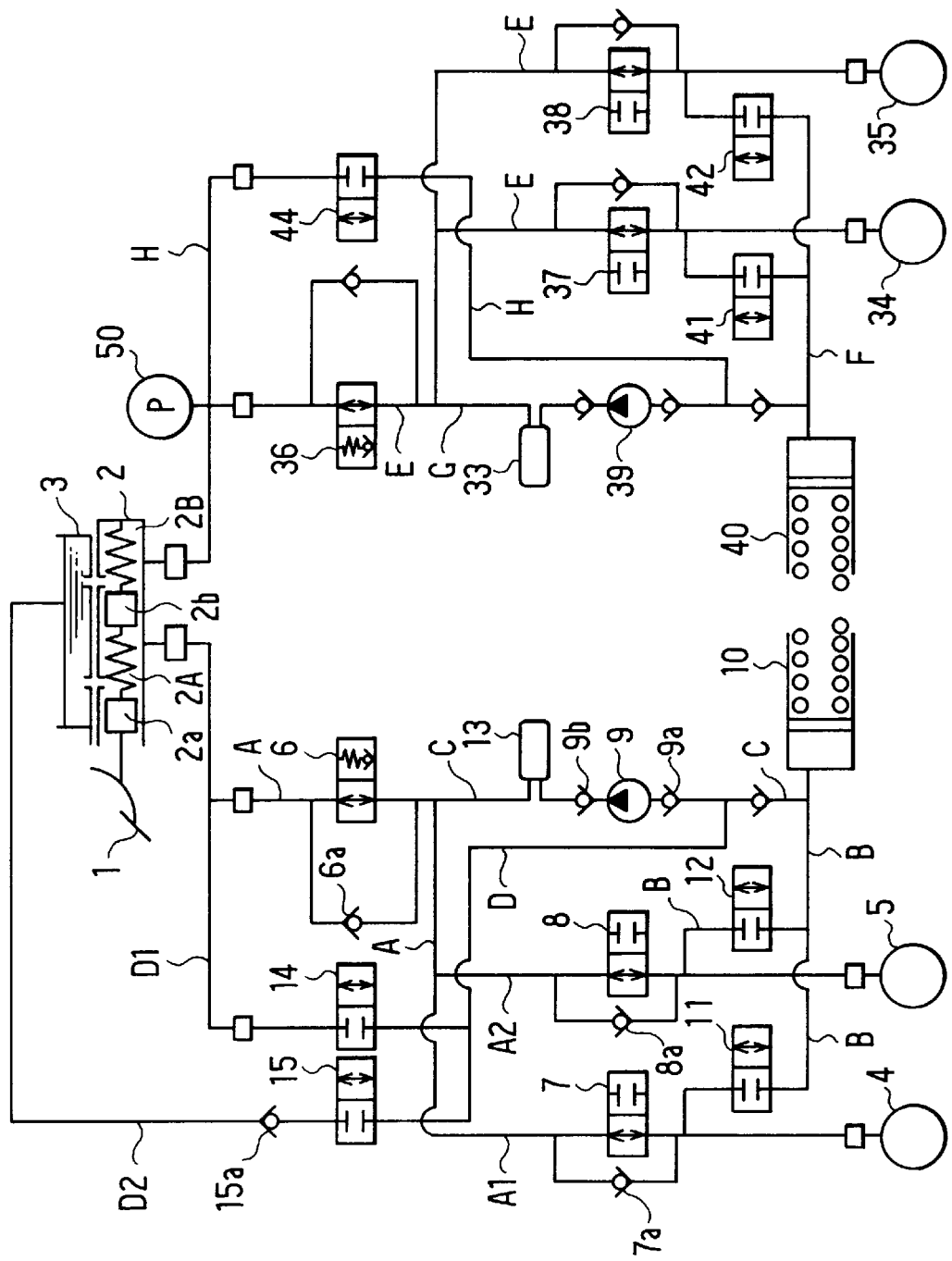
FIG. 1 is a hydraulic circuit diagram of a brake system in a first embodiment of the present invention.

The present invention will now be described with reference to embodiments shown in the drawings.

[First Embodiment]

FIG. 1 is a diagram of a hydraulic circuit in a brake system according to the first embodiment. This brake system has a side slip prevention system, an anti-lock braking system ("ABS"), and a traction control system ("TRC").

The basic construction of the brake system shown in this embodiment will now be described with reference to FIG. 1. In this embodiment, a brake system is applied to a rear wheel drive four wheeled vehicle having two piping systems (front and rear piping). A front wheel piping system controls brakes of the left and right front wheels and a rear wheel piping system controls brakes of the left and right rear wheels.

As shown in FIG. 1, a driver applies a brake pedal 1 to apply a braking force to the vehicle. The brake pedal 1 is connected to a master cylinder 2 constituting a brake fluid pressure producing source. When the driver steps on the brake pedal 1 the brake pedal 1 pushes on master pistons 2a, 2b disposed in the master cylinder 2. These master pistons 2a, 2b and the inner wall of the master cylinder 2 are contacted through seal members not shown in the diagram. A primary chamber 2A and a secondary chamber 2B of the master cylinder 2 are thereby liquid tightly separated. The master pistons 2a, 2b are connected by a spring constituting an elastic member and generate the same master cylinder pressure ("M/C pressure") in both the primary chamber 2A and the secondary chamber 2B of the master cylinder 2. A spring constituting an elastic member is also disposed between the master piston 2b farther from the brake pedal 1 and the inner end of the master cylinder 2, and acts to swiftly restore the pedal position along with return operation of the brake pedal 1.

A master reservoir 3 having passages connected to the master cylinder 2 is provided. Specifically, two passages connecting the master cylinder 2 and the master reservoir 3 are provided so as to respectively connect each of both the primary chamber 2A and the secondary chamber 2B of the master cylinder 2 to the master reservoir 3. The master reservoir 3 supplies brake fluid to the inside of the master cylinder 2 and holds surplus brake fluid from inside the master cylinder 2. Because the passages each have a diameter much smaller than the conduit diameters of main conduits extending from the primary chamber 2A and the secondary chamber 2B, they exhibit an orifice effect when brake fluid flows into the master reservoir 3 from the primary chamber 2A and the secondary chamber 2B of the master cylinder 2.

The M/C pressure is transmitted to the front wheel piping system and the rear wheel piping system. Here, since the front wheel piping system and the rear wheel piping system are of the same construction, the front wheel piping system will be described. With respect to the rear wheel piping system, only construction differing from the front wheel piping system will be described.

The front wheel piping system has a conduit A constituting a main conduit transmitting the above-mentioned M/C pressure to each of wheel braking force producing devices, namely a first wheel cylinder 4 for the right front wheel and a second wheel cylinder 5 for the left front wheel. By means of the conduit A, a wheel cylinder pressure ("W/C pressure") is produced in each of the wheel cylinders 4, 5.

A front wheel differential pressure control valve 6 is provided in conduit A. The control valve 6 comprises a second valve device which can be controlled between two positions of open and a differential pressure producing states. In a normal braking state the valve position is open. When electrical power is supplied to a solenoid coil (not shown in the diagram of this differential pressure control valve 6), the valve position becomes the differential pressure producing state. With the differential pressure producing state valve position in the differential pressure control valve 6, when the brake pressure of the wheel cylinder side becomes higher by a predetermined pressure than the M/C pressure, only flow of brake fluid from the wheel cylinder side to the M/C side is allowed. The respective conduits are protected by the pressure of the wheel cylinders 4, 5 side being prevented from rising higher by a predetermined pressure than the pressure of the master cylinder 2 side at all times.

The conduit A on the downstream or wheel cylinder side of this differential pressure control valve 6 branches into two conduits A1 and A2. Also, one conduit contains a first pressure increase control valve 7 for controlling increase of the brake fluid pressure to the first wheel cylinder 4 and the other conduit contains a second pressure increase control valve 8 for controlling increase of the brake fluid pressure to the second wheel cylinder 5. These first and second pressure increase control valves 7, 8 are constructed as two-position valves which can be controlled between open and closed states. When these first and second pressure increase control valves 7, 8 are opened, the M/C pressure or a brake fluid pressure created by the delivery of brake fluid of a front wheel pump 9 can be applied to the first and second wheel cylinders 4, 5.

During normal braking by the driver, the differential pressure control valve 6 and the first and second pressure increase control valves 7, 8 are always controlled to be open. Safety valves 6a, 7a, 8a are disposed in parallel with the differential pressure control valve 6 and the first and second pressure increase control valves 7, 8, respectively. The safety valve 6a disposed in parallel with the differential pressure control valve 6 allows the M/C pressure to flow to the wheel cylinders of the left and right front wheels when the driver applies the brake pedal 1 when the valve position of the differential pressure control valve 6 is that of the differential pressure producing state. The safety valves 7a, 8a disposed in parallel with the pressure increase control valves 7, 8 are provided to allow the wheel cylinder pressures of the left and right front wheels to decrease correspondingly to a brake pedal return operation when, particularly during anti-skid control, the first and second pressure increase control valves 7, 8 closed and the brake pedal 1 has been returned by the driver.

In conduits B connecting the conduits A between the first and second pressure increase control valves 7, 8 and the wheel cylinders 4, 5 to the reservoir hole 10a of a reservoir 10 for ABS control use, a first pressure decrease control valve 11 and a second pressure decrease control valve 12 are respectively provided as two-position valves which can be controlled by an ECU between open and closed states. These first and second pressure decrease control valves 11, 12 are always closed during normal braking.

A conduit C connects the ABS control use reservoir 10 and conduit A, which is the main conduit. In conduit C a self-supplying front wheel pump 9 receives and delivers brake fluid from the ABS control use reservoir 10 to the master cylinder side or toward the wheel cylinders 4, 5. The front wheel pump 9 has safety valves 9a, 9b so that one-way intake and delivery is made possible. To moderate pulsations of brake fluid delivered by the front wheel pump 9 a fixed capacity damper 13 is disposed in the conduit C on the delivery side of the front wheel pump 9. The ABS control use reservoir 10 is provided to hold surplus brake fluid from the wheel cylinders, irrespective of whether during ABS control or not.

A conduit D is connected to the conduit C between the ABS control use reservoir 10 and the front wheel pump 9. Conduit D branches into two conduits, and a first conduit D1 is connected to the primary chamber 2A of the master cylinder 2 and a second conduit D2 is connected to the master reservoir 3. A first control valve 14 and a second control valve (first valve devices) 15 which can be controlled between an open state and a closed state are provided in the conduits D1, D2 respectively. A nonreturn valve 15a for preventing brake fluid from moving toward the master reservoir 3 is provided in conduit D2. Therefore, the front wheel pump 9 can take in brake fluid through the conduit D from the master cylinder 2 and the master reservoir 3 and deliver it to the conduit A. That is, by means of this one pump 9, it is possible to take in brake fluid from the master cylinder 2 and the master reservoir 3 during TRC control, during ABS control and during sideslip prevention control.

The rear wheel piping system is substantially the same as the construction in the front wheel piping system. That is, the differential pressure control valve 6 corresponds to a rear wheel differential pressure control valve 36. The first and second pressure increase control valves 7, 8 respectively correspond to third and fourth pressure increase control valves 37, 38. The first and second pressure decrease control valves 11, 12 respectively correspond to third and fourth pressure decrease control valves 41, 42. The front wheel first control valve 14 corresponds to a rear wheel first control valve 44. The front wheel pump 9 corresponds to a rear wheel pump 39. The conduit A, conduit B, conduit C and conduit D respectively correspond to conduit E, conduit F, conduit G and conduit H.

However, the rear wheel piping system does not provide a conduit (equivalent to the second conduit D2 in the front wheel piping system) connecting the conduit G between an ABS control use reservoir 40 and the rear wheel pump 39 to the master reservoir 3. This is to reduce the cost of this conduit part and to increase the failsafe ability of the system. With respect to resistance of the system to failure, for example, in the front wheel piping system, because the conduit D2 is connected to the master reservoir 3, there is a possibility of the front wheel second control valve 15 and the nonreturn valve 15a failing to open. However, if a conduit equivalent to the conduit D2 is not provided in one of the two piping systems of the front wheel side and rear wheel side, there is no possibility of the piping system failing to open and the failsafe characteristic of the system improves.

A pressure sensor or pressure detecting device 50 for essentially detecting the M/C pressure is disposed in the conduit H in the vicinity of the master cylinder 2.

Figure 2:
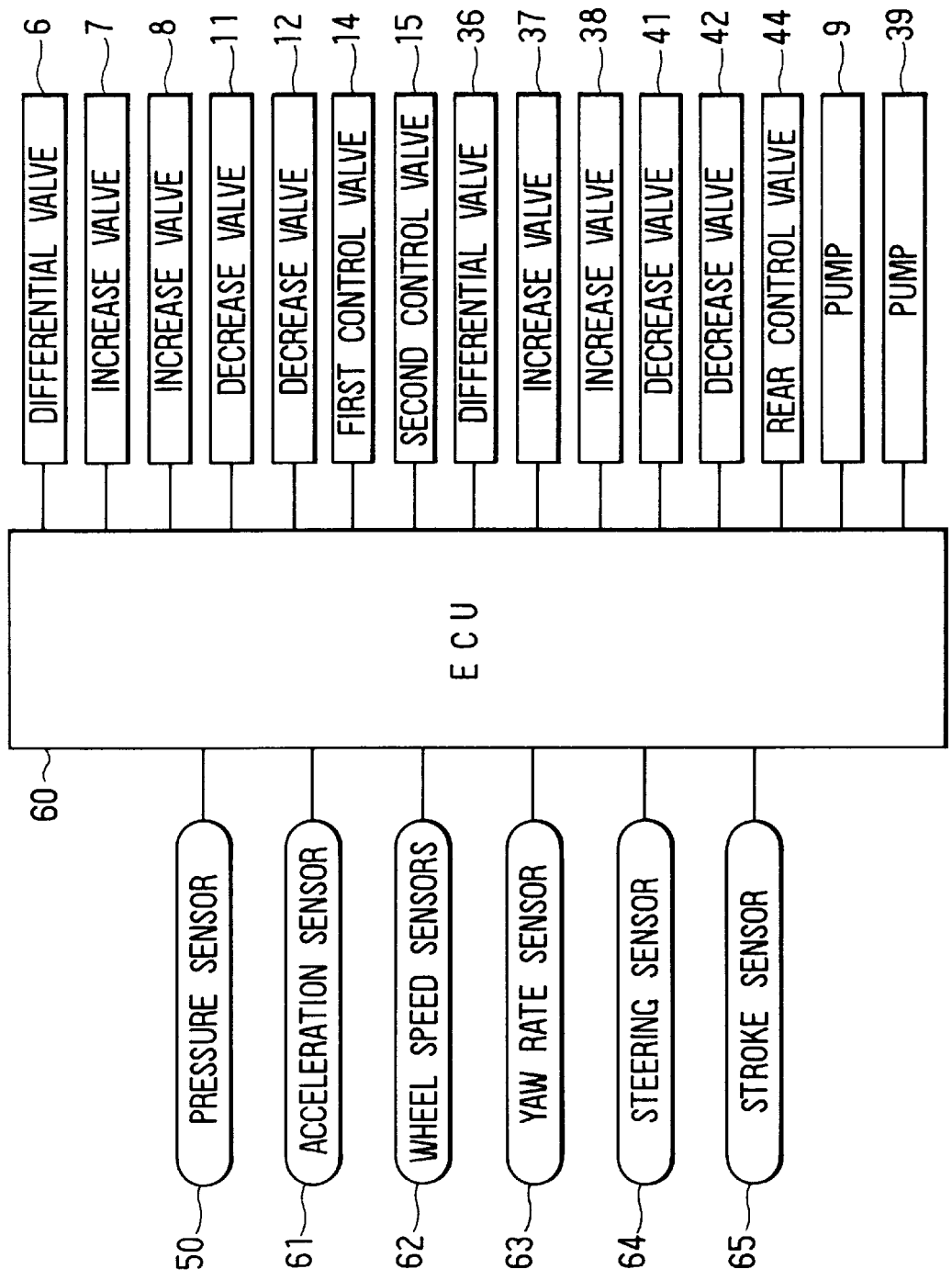
FIG. 2 is a schematic view in an electronic control unit for the brake system.

The control valves disposed in the front and rear piping systems are controlled by a brake system electronic control unit (the "ECU") 60 in FIG. 2 on the basis of signals sent from various sensors 50, 61 through 65.

Next, TRC control, sideslip prevention control, and ABS control shown in FIG. 3, carried out by the ECU 60 will be described using flow charts.

Figure 3:
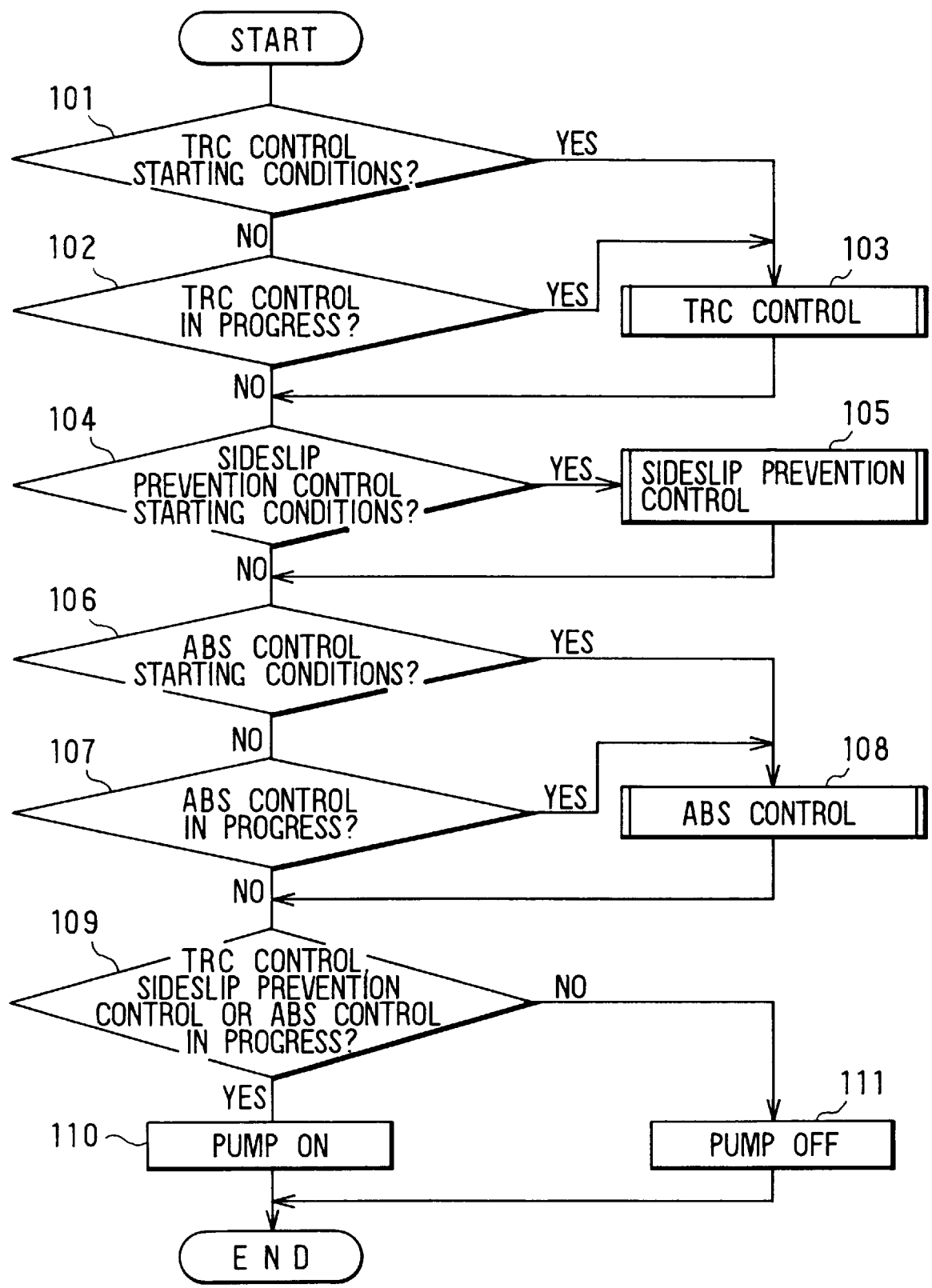
FIG. 3 is a flow chart of control processing carried out by the electronic control unit shown in FIG. 2.

First, as shown in FIG. 3, the system carries out a determination of whether control starting conditions of TRC control, sideslip prevention control or ABS control are established or if any control is in progress.

That is, step 101 represents determining whether or not TRC control starting conditions are established. If TRL control starting conditions are established, processing proceeds to step 103 for TRC control and then proceeds to step 104. When the TRC control starting conditions are satisfied, a flag is set or the like to establish a record that TRC control is in progress by a flag being set or the like.

As an example of the TRC control starting conditions, one condition may be an accelerating slip ratio of 25% or over and the like. This accelerating slip ratio is computed from a vehicle acceleration and wheel speeds detected by an acceleration sensor 61 for detecting the vehicle acceleration and wheel speed sensors 62 mounted in correspondence with the wheels.

When in step 101 the TRC control starting conditions are not established, processing proceeds to step 102. Step 102 represents determining whether or not TRC control is in progress, and if TRC control is in progress, proceeding to step 103 and continuing TRC control. If in step 102 TRC control is not in progress then processing proceeds to step 104.

Step 104 represents determining whether sideslip prevention control starting conditions are established. If they are established, the process proceeds to step 105 to carry out sideslip prevention control and then proceeds to step 106. This sideslip prevention control includes, for example, increasing the trace characteristic while turning the vehicle.

These sideslip prevention control starting conditions include, for example, the error between an actual vehicle turning angle and a target tuning angle exceeding a predetermined value and the like. The actual vehicle turning angle is obtained from a yaw rate detected by a yaw rate detector 63. The target turning angle is set from a steering angle detected by a steering sensor 64 and a vehicle speed detected by the wheel speed sensors 62. As the control starting conditions, the error between an actual lateral acceleration and an estimated lateral acceleration of the vehicle and the like can be adopted. Which wheel will be used for sideslip prevention control to be executed is determined on the basis of the actual vehicle turning angle and a target vehicle 25 turning angle.

In step 106 it is determined whether or not ABS control starting conditions are established. If they are established, the process proceeds to step 108 and carries out ABS control. As these ABS control starting conditions, a braking slip ratio being 20% or more and the like can be adopted. This braking slip ratio is obtained in the same way as the accelerating slip ratio mentioned above.

If in step 106 the ABS control starting conditions are not established, processing proceeds to step 107. In step 107 it is determined whether or not ABS control is in progress. If ABS control is in progress, processing proceeds to step 108 and continues ABS control. If in step 107 ABS control is not in progress, processing proceeds to step 109.

In step 109, it is determined whether or not TRC control, sideslip prevention control or ABS control is in progress. If any of them is in progress processing proceeds to step 110 and drives the pumps 9, 39. If none of them are in progress processing proceeds to step 111 and stops the pumps 9, 39.

Figure 4:
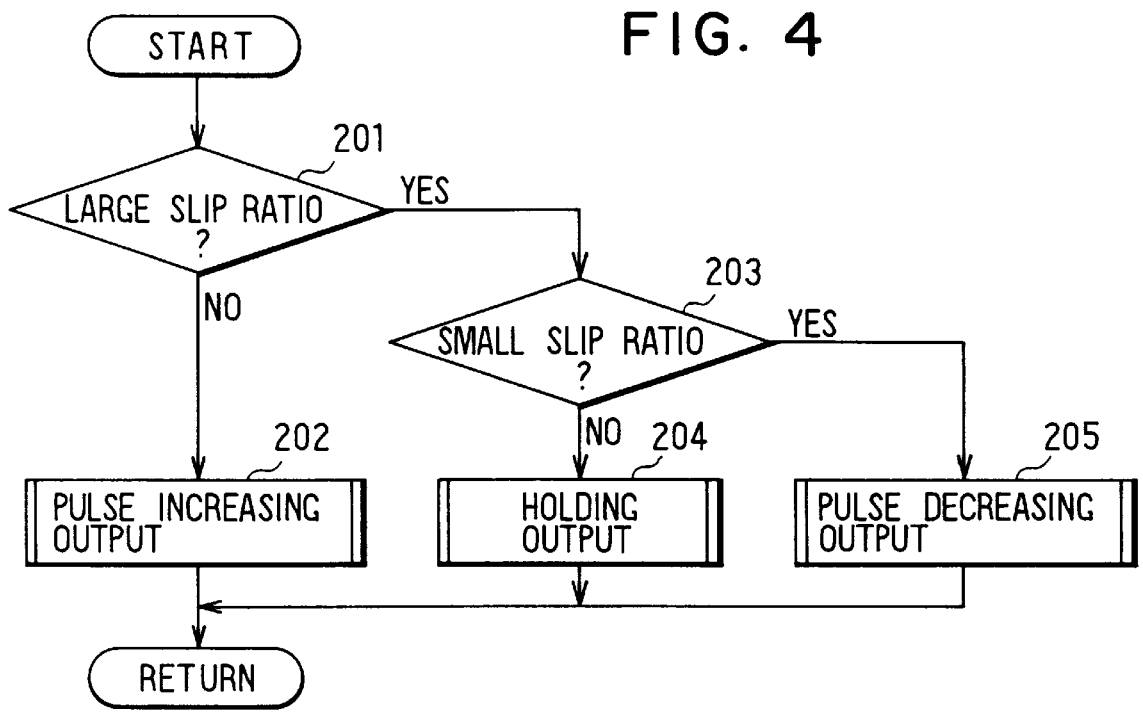
FIG. 4 is a flow chart in TRC control processing.
Figure 6:
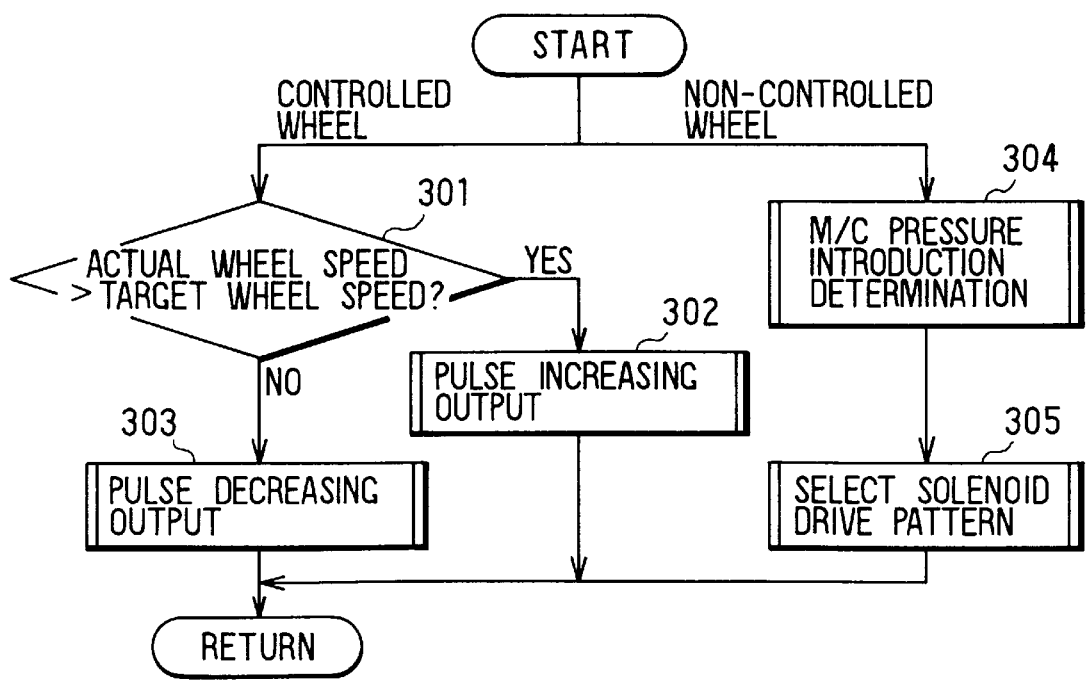
FIG. 6 is a flow chart in sideslip prevention control processing.
Figure 9:
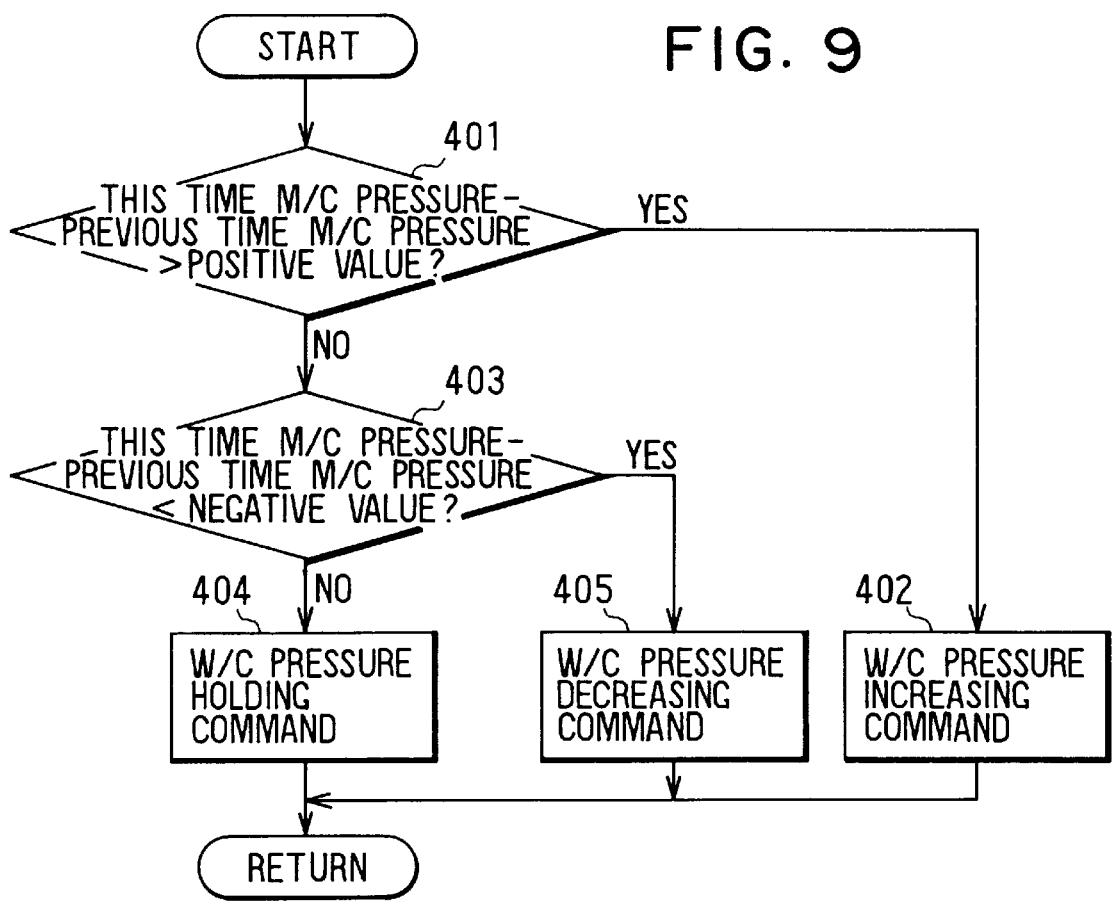
FIG. 9 is a flow chart for an M/C pressure introduction determination in sideslip prevention control.

The processings in the above-mentioned step 103, step 105 and step 108 correspond with the flow charts in FIG. 4, FIG. 6 and FIG. 9, respectively. The brake system ECU 60 drives solenoids disposed in the control valves to move the valve positions of the control valves on the basis of these processes.

Figures 10A, 10B:
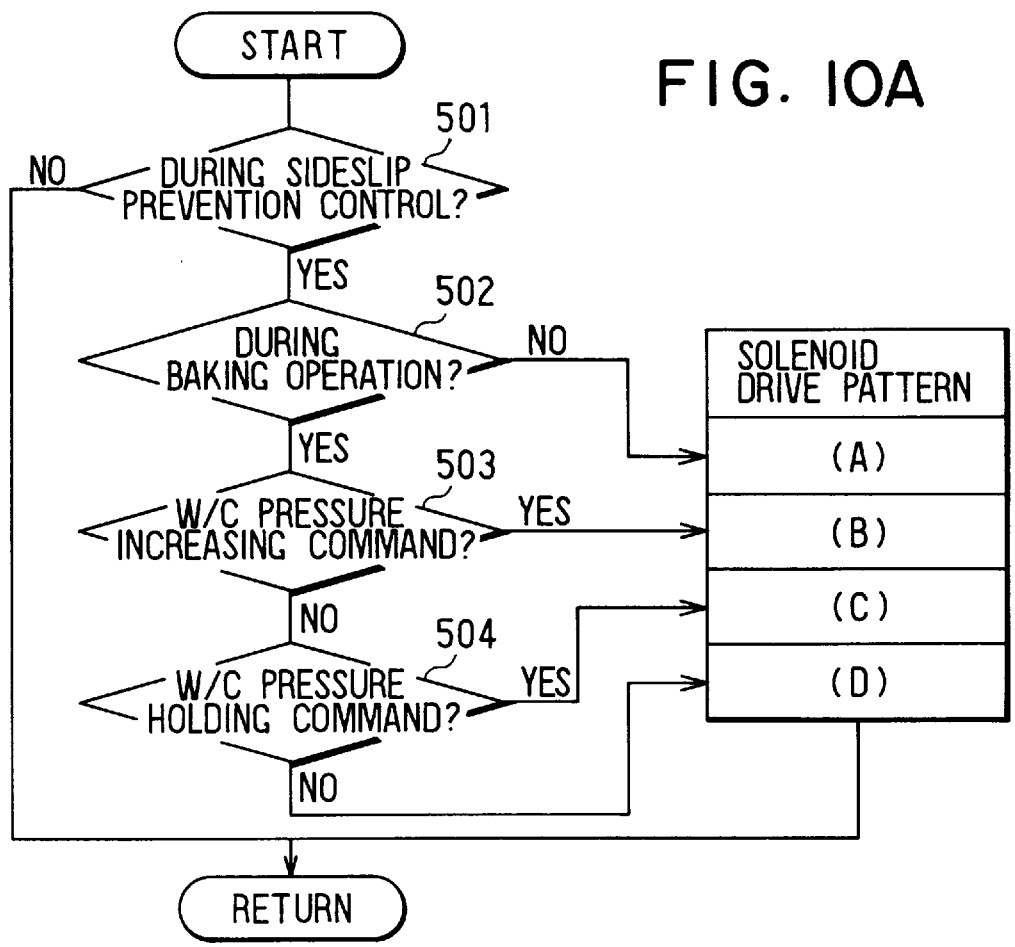
FIG. 10A is a flow chart to select a solenoid drive pattern in sideslip prevention control and FIG. 10B is a view showing solenoid drive patterns selected in sideslip prevention control processing.

Solenoid drive patterns are shown in FIG. 5, FIG. 8 and FIG. 10B. Regarding the ON and the OFF states shown in these figures, when there is no movement from the valve position in normal braking (showing the state of FIG. 1) it is shown with OFF and conversely when the valve position is moved it is shown with ON.

TRC control, sideslip prevention control and ABS control will each be described below.

(Processing in TRC Control)

The TRC control of step 103 is shown in detail in FIG. 4. This processing is carried out for each driving wheel, for example when a determination is ended for the left rear wheel, a determination is carried out for the right rear wheel and the process ends after all the driving wheels are finished.

First, step 201, represents determining whether or not the slip ratio is larger than a first predetermined value, for example 20%. If it is larger, processing proceeds to step 202 and sets a pulse increasing output. When the pulse increasing output is set, the valve positions of the control valves are brought to the positions according to the solenoid drive pattern (A) shown in FIG. 5. That is, the front wheel differential pressure control valve 6 is brought to its on-state (open state), the front wheel first control valve 14 to its off-state (closed state), the front wheel second control valve 15 to its on-state (open state), the rear wheel differential pressure control valve 36 to its on-state (differential pressure producing state), the rear wheel control valve 44 to is on-state (open state), and the first and second pressure increase control valves 7, 8 to their closed states. Further, because when TRC control is in progress because as a result of the processing of step 110 the front wheel pump 9 and the rear wheel pump 39 become in the driven-state, when the rear wheel control valve 44 opens the master cylinder 2 and the rear wheel pump 39 become in the connected-state and brake fluid is drawn in from the master cylinder 2 through the conduit H. According to the accelerating slip ratio of that time, duty control is carried out for the third and fourth pressure increase control valves 37, 38. By the valve positions of these being suitably changed, brake fluid of a required portion of the brake fluid taken in by the pump 39 is supplied to the third and fourth wheel cylinders 34, 35. In this way braking can be applied to both of the rear wheels, which are the driving wheels.

Because the front wheel second control valve 15 is open, when the front wheel pump 9 is driven brake fluid is drawn from the master reservoir 3 through the conduit D. Then, because the first and second pressure increase control valves 7, 8 are closed, the brake fluid drawn by the front wheel pump 9 is supplied through the open front wheel differential pressure control valve 6 to the primary chamber 2A (the cylinder chamber on the pedal side of the master cylinder 2 shown in FIG. 1) of the master cylinder 2. Due to the orifice effect of the passages between the master reservoir 3 and the primary chamber 2A as well as the secondary chamber 2B an M/C pressure is produced in the primary chamber 2A (for example 2 to 5 atmospheres).

When brake fluid from the master reservoir 3 is drawn into the front wheel pump 9, because the master reservoir 3 is essentially opened to atmospheric pressure, the drawing resistance due to negative pressure is small. That is, when the rear wheel pump 39 in the rear wheel piping system draws brake fluid from the secondary chamber 2B of the master cylinder 2, if it is assumed that there is no pushing force from the primary chamber 2A side to the secondary chamber 2B side, a negative pressure arises in the secondary chamber 2B and the drawing resistance becomes large. As a result, the pressure increase gradient of the wheel cylinder pressure may fall because the rear wheel pump 39 cannot deliver the sufficient amount of brake fluid. However, because as a result of the delivery of the front wheel pump 9 whose drawing resistance is low and whose responsiveness is good, an M/C pressure is produced in the primary chamber and an equal pressure is produced in the secondary chamber also. Therefore, it is possible to enhance the responsiveness of drawing and delivery of the rear wheel pump by means of this pressure.

For the rear wheel pump 39, a self-supplying pump may be used, but since as mentioned above a pressure produced in the master cylinder 2 acts at the inlet of the rear wheel pump 39 by way of the control valve 44, it is also possible to employ a non-self-supplying pump for the rear wheel pump 39.

Also, since the amount of brake fluid drawn from he master reservoir 3 is essentially the amount of brake fluid required for applying a back pressure to the rear heel pump 39, a poor condition does not arise in the master cylinder 2 due to the brake fluid drawn by the front wheel pump 9. The reason is that an amount of brake fluid and a brake fluid pressure surplus to requirements in the primary chamber of the master cylinder 2 are returned to the master reservoir 3 through the passages having an orifice effect.

Further, because the rear wheel piping system is only receiving a pump back pressure created by brake fluid introduced into the primary chamber 2A of the master cylinder 2, and brake fluid originally existing in the secondary chamber 2B is drawn and delivered to the wheel cylinder side by the rear wheel pump 39, when brake fluid having produced the W/C pressure is returned to the master cylinder 2 only an amount of brake fluid drawn from the secondary chamber 2B is returned to the secondary chamber 2B. Consequently, an excessive load does not act on the seals and so on of the master cylinder 2.

If in step 201, the accelerating slip ratio is smaller than the first predetermined value, processing proceeds to step 203. In step 203 it is determined whether or not the accelerating slip ratio is smaller than a second predetermined value, for example 10%, and if it is larger processing proceeds to step 204 and a holding output is set.

When a holding output is set, the valve positions of the control valves are made according to a solenoid drive pattern (B) shown in FIG. 5. That is, the third and fourth pressure increase control valves 37, 38 are closed and the W/C pressure increased as described above is held.

When in step 203 the accelerating slip rate is smaller than the second predetermined value, a pulse decreasing output is set. When a pulse decreasing output is set, the valve positions of the control valves are made the positioned according to a solenoid drive pattern (C) shown in FIG. 5. That is, the third and fourth pressure decrease control valves 41, 42 are duty-controlled and brake fluid is allowed to escape to the ABS control use reservoir 40 and the W/C pressure held as described above is thereby reduced.

When after this pulse decreasing output is set a predetermined time elapses without the setting being changed to a holding output or an increasing output, the flag indicating that TRC control is in progress is reset.

(Processing for Sideslip Prevention Control)

The sideslip prevention control processing of step 105 is shown in FIG. 6. This processing is carried out in parallel for all the wheels, and processing is ended when it has finished for all four wheels.

Figure 7:
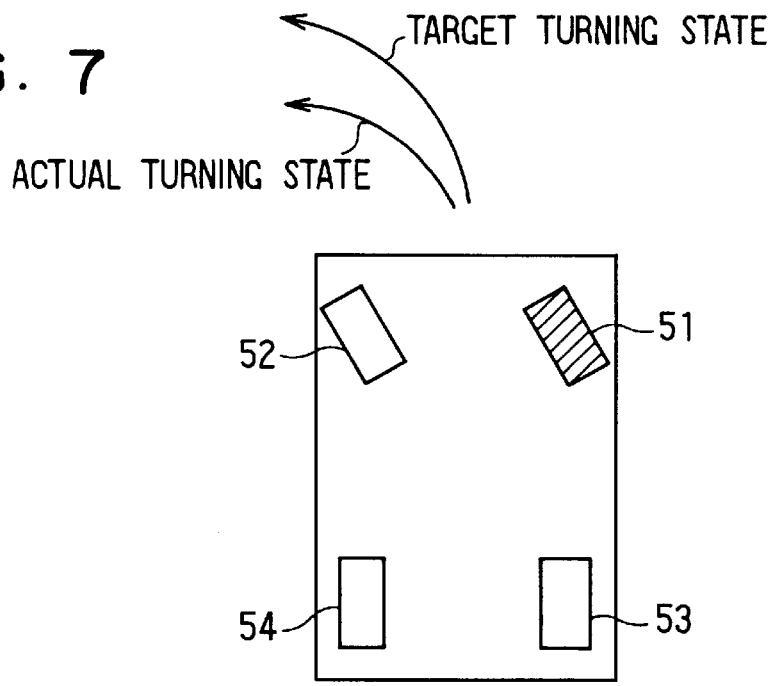
FIG. 7 is an explanatory view for explaining control of wheels in sideslip prevention control processing.

In this sideslip prevention control, when oversteering while turning the vehicle occurs, by applying a braking force to one of the left and right front wheels according to the turning direction, the oversteering can be cancelled. For example, as shown in FIG. 7, when the vehicle is turning to the left and oversteering state has occurred, as shown by the hatched part of FIG. 7, a braking force is applied to the right front wheel 51. Also, if understeering occurs in the vehicle (not shown in drawings), a braking force may be applied to the inner front wheel of a turning line. The understeering state can also be reduced by applying a braking force to both of the rear wheels 53, 54.

In the following description, sideslip prevention control for applying a braking force to the right front wheel 51 is carried out for oversteering as shown in FIG. 7. Also, the description will be divided into a time of non-braking of the vehicle and a time of braking.

(a) Processing while not braking

The processing shown in FIG. 6 is carried out simultaneously for a controlled wheel for which sideslip prevention control is carried out and non-controlled wheels for which sideslip prevention control is not carried out. Whether or not a wheel is a sideslip prevention controlled wheel is determined according to whether or not in step 104 the actual vehicle turning angle has deviated in either direction 32 from the target turning angle.

During oversteering in FIG. 7, because the wheel being sideslip prevention controlled is the right front wheel 51, step 301 is executed with respect to the right front wheel 51. In step 301, a target wheel speed set as a wheel speed corresponding to the current state of the slip angle is compared to the actual wheel speed at the right front wheel 51. That is, it is determined whether or not the speed of the right front wheel 51 being controlled has exceeded the target wheel speed. If the actual wheel speed has exceeded the target wheel speed, processing proceeds to step 303 and sets a pulse increasing output to reduce the actual wheel speed.

When the pulse increasing output is set, the brake system ECU 60 drives the solenoids of the control valves and moves their valve positions according to a solenoid drive pattern (A) shown in FIG. 8. That is, when the pulse increasing output is set, the front and rear wheel differential pressure control valves 6, 36 are brought to their on-state (differential pressure producing state), the front wheel first control valve 14, the rear wheel control valve 44 and the front wheel second control valve 15 to their on-state (open state), and the first pressure decrease control valve 11 to its off-state (closed state). For the first pressure increase control valve 7 pertaining to the right front wheel 51 (controlled wheel), duty control is carried out.

When sideslip control is in progress, the front wheel pump 9 and the rear wheel pump 39 are in a driven-state as a result of the processing of step 110. Consequently, when, as a result of the processing described above, the front wheel second control valve 15 opens, brake fluid in the master reservoir 3 is drawn through the opened conduit D and that drawn brake fluid is delivered to the conduit A. Because the front wheel first control valve 14 is also opened, brake fluid in the master cylinder 2 is also drawn by the front wheel pump 9. Then, brake fluid delivered into the conduit A is supplied to the first wheel cylinder 4 through the first pressure increase control valve 7, which is being duty controlled to increase the W/C pressure thereof.

Thus, during non-braking or when an M/C pressure has not been produced, because brake fluid is drawn not just from the master cylinder 2 but also directly from the master reservoir 3, the flow resistance can be made small. In particular, even at low temperatures when the flow resistance of brake fluid increases, the responsiveness in sideslip prevention control can remain good.

In step 301, if the actual wheel speed is lower than the target wheel speed, processing proceeds to step 303 and sets a pulse decreasing output to increase the actual wheel speed. When a pulse decreasing output is set, the solenoids in the control valve are driven to move to the valve positions according to the solenoid drive pattern (B) shown in FIG. 8. That is, the first pressure increase control valve 7 pertaining to the right front wheel 51 is brought to its on-state (closed state) and duty control is carried out for the first pressure decrease control valve 11. Brake fluid is then allowed to escape to the ABS control use reservoir 10 through the conduit B and the W/C pressure is thereby reduced.

With respect to the non-controlled wheels, processing proceeding to step 304 is executed. In step 304, after M/C pressure introduction determination (the details thereof will be discussed later) is carried out, processing proceeds to step 305 and selection of a solenoid drive pattern is carried out according to a result of the M/C pressure introduction determination.

The detailed processing for selecting the solenoid drive pattern is shown in FIGS. 10A and 10B. First, in step 501, it is determined whether or not either of the front wheels is in sideslip prevention control. In this description, because it is being assumed that sideslip prevention control is being carried out for the right front wheel 51, that determination is YES and processing proceeds to step 502. In step 502, it is determined whether or not the driver is currently applying the brake. This determination is accomplished by detecting whether or not the brake pedal 1 is in a moving state based on the signal of a stroke sensor 65. Because in this example, the driver is currently not braking, the solenoid drive pattern (A) shown in FIG. 10B is selected. That is, the pressure increase valve of the non-controlled wheel is brought to the on-state (closed state), and the pressure decrease valve to the off-state (closed state). The valve positions of the other control valves are the same as the valve positions selected in the processing for the controlled wheel.

Therefore, for the non-controlled wheel, because the pressure increase control valves are closed, a braking force is not applied to the non-controlled wheels.

(b) Processing while Braking

Next, processing while braking, i.e., when the driver has stepped on the brake pedal 1 and a braking force is applied to the vehicle, will be described. This processing during braking includes both cases where application of the brake pedal after oversteering occurred during non-braking and when oversteering occurred after the brake pedal was stepped on.

At the time of braking, for the right front wheel 51 that is the controlled wheel, by the processing of steps 301 through 304, control is carried out to make the wheel speed of the right front wheel 51 approach the target wheel speed. With respect to the non-controlled wheels, the W/C pressure of each wheel is increased, held, or decreased to apply a suitable W/C pressure. In the M/C pressure introduction determination of step 304, it is determined which command should be output: increase, holding, or decrease of the W/C pressure with respect to each of the non-controlled wheels. The detailed processing of step 304 is shown in FIG. 9. First, in step 401, it is determined whether or not the difference between this time's M/C pressure detected by the pressure sensor 50 and the M/C pressure detected by the pressure sensor 50 at the time of the previous determination (this time's M/C pressure—the previous time's M/C pressure) is greater than a positive predetermined reference value (for example 5 atmospheres). That is, in the M/C pressure introduction determination of the previous time, the M/C pressure of that time was stored and that stored M/C pressure and the M/C pressure at the time of the present processing are compared. In the M/C pressure introduction determination of the initial time, the M/C pressure base has been set to zero and a comparison of this value (zero) and the M/C pressure of the initial time is carried out. If the difference between the previous time and this time is equal to or greater than a predetermined value, processing proceeds to step 402 and outputs a pressure increase command because it is determined that the driver is still stepping on the brake pedal 1.

When the determination in step 401 is NO, processing proceeds to step 403 and determines whether or not the difference between this time's M/C pressure and the previous time's M/C pressure is smaller than a negative predetermined reference value (for example −5 atmospheres). When the difference between the previous time and this time is equal to or greater than the negative predetermined value, a holding command is outputted in step 404. If the difference between the previous time and this time is lower than the negative predetermined value, a pressure decreasing command is outputted in step 405 because it is determined that the driver returned the brake pedal 1. That is, in a case where during braking the driver has stepped on the brake pedal 1 further than the previous time ("during brake stepping"), a pressure increasing command is issued as a result of the processing described above. When there is almost no change in the position of the brake pedal 1 ("during brake holding") a holding command is issued as a result of the processing described above. When the stepping force on the brake pedal 1 has been reduced ("during brake releasing") a pressure decreasing command is issued as a result of the processing described above.

Operations described below will be divided into different states: during brake stepping, during brake holding and during brake releasing.

(1) During Brake Stepping

During brake stepping, while processing the M/C pressure introduction determination, a W/C pressure increasing command is issued. Therefore, when selecting the solenoid drive pattern shown in step 305, the process has reached step 502, because it is during braking the determination thereof is YES and processing proceeds to step 503. In step 503, because a W/C pressure increasing command has been issued, the solenoid drive pattern (B) shown in FIG. 10B is selected. When processing during braking, a solenoid drive pattern selected for non-controlled wheels is given priority over the solenoid drive pattern selected for the controlled wheel (in the cases of holding and pressure decreasing discussed later, priority is also given to the solenoid drive pattern selected for the non-controlled wheels).

That is, even when after this selection for the non-controlled wheels has been made, a solenoid drive pattern is selected for the controlled wheel as shown in FIG. 6. According to the solenoid drive pattern selected for the non-controlled wheels, the valve positions of the front and rear wheel differential pressure control valves 6, 36, the front wheel first and second control valves 14, 15 and the rear wheel control valve 44 are set. Therefore, on the basis of the selected solenoid drive pattern the front and rear wheel differential pressure control valves 6, 36 are brought to the on-state (differential pressure producing state), the front wheel second control valve 15 to a duty-controlled state (open and closed states), and the front wheel first control valve 14 and the rear wheel control valve 44 to the on-state (open state). Also, of the non-controlled wheels, duty control is carried out for the pressure increase control valve pertaining to a wheel for which a WIC pressure increasing command has been issued at the present processing.

For example, if the left front wheel 52 is the wheel for which the W/C pressure increasing command has been issued, duty control is carried out for the second pressure increase control valve 8 pertaining to the left front wheel 52. In this case, brake fluid is delivered by the front wheel pump 9 from conduit D1 to conduit A which increases the W/C pressure in the left front wheel 52.

As a result of this pressure increasing command, in wheel cylinders of wheels other than the right front wheel 51 that are the non-controlled wheels, brake fluid is increased to substantially the same pressure as the M/C pressure (if pressure decreasing control has not been executed) and a pressure adjusted by sideslip prevention control is applied to the right front wheel (the wheel to be controlled).

Also, at this time, because the conduit D2 is in the duty-controlled state of the second control valve 15, a small amount of brake fluid is drawn from the master reservoir 3 and assists the brake fluid pressure of the non-controlled wheel to rapidly increase. It is to be noted that the second control valve may be in the closed state instead of the duty-controlled state. In this case, there is no counterflowing of surplus brake fluid all at once to the master cylinder 2 when the brake pedal 1 is released. Consequently, it is possible to achieve protection of the master cylinder 2 and to avoid a state wherein the driver cannot apply the brake pedal 1.

(2) During Brake Holding

During brake holding, when the process reaches step 504 and the determination therein is YES, the solenoid drive pattern (C) shown in FIG. 10B is selected. Therefore, on the basis of the selected solenoid drive pattern, the front and rear wheel differential pressure control valves 6, 36 are controlled to be in the on-state (differential pressure producing state), the front wheel second control valve 15 to the off-state (closed state), and the front wheel first control valve 14 and the rear wheel control valve 44 to the on-state (open state) . Also, of the non-controlled wheels, the pressure increase control valve pertaining to a wheel for which a W/C pressure holding command has been issued at the present processing is controlled to be in the on-state (closed state) and the pressure decrease control valve is made off-state (closed state).

Thus, because the pressure increase control valve of a wheel for which a W/C pressure holding command has been issued is made closed-state, that W/C pressure is held.

(3) During Brake Release

During brake release, the determination in step 504 is NO, and the solenoid drive pattern (D), is selected. Therefore, on the basis of the selected solenoid drive pattern (D), the front and rear wheel differential pressure control valves 6, 36 are brought to the on-state (differential pressure producing state), the front wheel second control valve 15 to the off-state (closed state), and the front wheel first control valve 14 and the rear wheel control valve 44 to the on-state (open state). Also, of the non-controlled wheels, the pressure increase control valve pertaining to a wheel for which a W/C pressure decreasing command has been issued at the present processing is made on-state (closed state) and for the pressure decrease control valve pertaining thereto, duty control is carried out.

On the basis of this solenoid drive pattern (D), of the non-controlled wheels, if it is supposed that the wheel for which a W/C pressure decreasing command has been issued at present processing is for example the left front wheel 52, duty control is carried out for the second pressure decrease control valve 12 pertaining to that left front wheel 52. As a result, the brake fluid in the conduit A between the closed second pressure increase control valve 8 and the wheel cylinder 5 is suitably allowed to escape to the ABS control use reservoir 10 and the W/C pressure in the left front wheel 52 is thereby decreased.

In response to the W/C pressure increasing command, the WlC pressure decreasing command and the W/C pressure holding command, the front wheel first control valve 14 and the front wheel second control valve 15 can also be suitably made on-state or off-state or duty-controlled. For example, when the M/C pressure has become less than 5 atmospheres, the front wheel second control valve 15 may be made on-state. When the front wheel second control valve 15 is made on-state, the front wheel pump 9 can draw brake fluid from the master reservoir 3 and this brake fluid is delivered to the master cylinder 2 side, whereby an M/C pressure is produced. As a result, the rear wheel pump 39 can easily draw brake fluid inside the master cylinder 2.

Also, when a W/C pressure increasing command issues, at times such as immediately before sideslip prevention control is started, ABS control may be concurrently carried out. At this time, carrying out duty control for the front wheel first control valve 14 and making the amount of brake fluid in the conduit C slightly low makes it easier for brake fluid stored in the ABS control use reservoir 10 to be drawn by the front wheel pump 9.

Also, a timing chart in sideslip prevention control is shown in FIGS. 11A to 11K. This timing chart represents a simulation result in a case wherein a driver has rotated the steering wheel to the left.

That is, as shown in FIGS. 11A and 11B, when the driver turns the steering wheel and the sideslip prevention control starting conditions are established, sideslip prevention control begins (t1 in FIGS. 11A to 11K). A pulse increasing output is set and as shown in FIGS. 11F through 11K, and signals for moving the valve positions ("C", "g") of the respective valves are transmitted and a motor (not shown) drives the pumps 9, 39. As a result, as shown in FIG. 11D, brake fluid pressure is produced in the wheel cylinder of the sideslip prevention controlled wheel.

Next, when the driver applies the brake 43 pedal 1, as shown in FIG. 11C, the M/C pressure increases. Then, in the M/C pressure introduction determination, processing accompanying generation of the M/C pressure is carried out. In other words, along with M/C pressure increasing, a W/C pressure increasing command (see FIG. 11E) is set and the W/C pressures of the non-controlled wheels are suitably increased (time t2 in FIG. 11E). Then, when pressure increasing has ended, a W/C pressure holding command (see FIG. 11E) is set and the W/C pressures of the non-controlled wheels are maintained.

Then, when the driver stops applying the brake pedal 1, i.e., the driver returns the brake pedal 1, the M/C pressure decreases. Along with this decrease of the M/C pressure, a W/C pressure decreasing command (see FIG. 11E) is set and the W/C pressures of the non-controlled wheels are suitably reduced (time t3 in FIG. 11E).

When sideslip prevention control is carried out in this way the following kinds of effect are obtained.

First, when during non-braking an M/C pressure has not been produced, because the front wheel pump 9 draws brake fluid from the master reservoir 3 not only through the front wheel first control valve 14 but also through the front wheel second control valve 15, the drawing resistance is low and the increase gradient of the W/C pressure can be made large so that the responsiveness can be improved.

In sideslip prevention control during braking, because an M/C pressure exists because the brake pedal is applied, there is not a large drawing resistance even if the brake fluid is drawn from the master cylinder 2. Further, during the increase of W/C pressures of the non-controlled wheels, the front wheel second control valve 15 is duty-controlled. Thereby, excess brake fluid is not added to the wheel cylinders 4, 5 from the master cylinder 2. As a result, during return of brake fluid of the wheel cylinders 4, 5 side to the master cylinder 2, an amount of brake fluid much greater than the amount of brake fluid having originally flowed out to the wheel cylinders 4, 5 from the master cylinder 2 is not returned at once to the master cylinder 2. Therefore, this protects the seal parts of the master cylinder 2 and prevents a large brake fluid shock to the master cylinder 2 accompanying brake fluid return.

In sideslip prevention control, in the above description, a brake fluid pressure was applied to the wheel cylinders 4, 5 of the left and right front wheel side only during non-braking to control the sideslip of the vehicle. However, in an alternate embodiment, a brake fluid pressure may be applied to the third and fourth wheel cylinders 34, 35 of the rear wheel side during non-braking, as described earlier. In this case, or as described above with traction control, the front wheel differential pressure control valve 6 may be made open-state and a brake fluid pressure transmitted to the rear wheel side through the master cylinder 2 in the order of the primary chamber 2A, the secondary chamber 2B of the master cylinder 2.

(Processing in ABS Control)

On the basis of FIG. 12, the processing in ABS control of step 108 will be described. ABS control according to this process is carried out for each wheel.

First, in step 601, it is determined whether or not the wheel for which ABS control processing is currently being carried out is a sideslip prevention controlled wheel. When the wheel for which ABS control processing is currently being carried out is the right front wheel 51, in step 601 it is determined that it is a sideslip prevention controlled wheel and processing is ended directly. In other words, with respect to a sideslip prevention controlled wheel, sideslip prevention control processing is given preference over ABS control processing. For example, if ABS control processing is currently being carried out in the left front wheel, which is other than the sideslip prevention controlled wheel, step 601 determines that it is not a sideslip prevention controlled wheel and processing proceeds to step 602.

Step 602 determines whether or not a decelerating slip ratio in the left front wheel 52 for which ABS control processing is currently being carried out is greater than 10% (as an example). If the slip ratio is smaller than 10%, processing proceeds to step 603 and sets a pulse increasing output and ends processing. After this pulse increasing output is set, when a predetermined time elapses without the setting being changed to a holding output or a pulse decreasing output, a flag indicating that ABS control is in progress is reset.

This pulse increasing output is set when the wheel has only a decelerating slip ratio of a level such that ABS control is not necessary. When the pulse increasing output is set, the valve positions of the respective valves are set according to solenoid drive pattern (A) shown in FIG. 13. That is, the front wheel first and second control valves 14, 15, the front wheel differential pressure control valve 6, the rear wheel differential pressure control valve 36 and the rear wheel control valve 44 are all made off-state and for the second pressure increase control valve 8 pertaining to the left front wheel 52 constituting the object of ABS control at present duty control is carried out, whereby the W/C pressure in the left front wheel 52 is suitably increased.

If in step 602 the decelerating slip ratio in the left front wheel 52 is greater than the predetermined value, processing proceeds to step 604. In step 604, it is determined whether or not the wheel speed in the left front wheel 52 is in the process of increasing. If the wheel speed in the left front wheel 52 is increasing, processing proceeds to step 605 and sets a holding output and then ends. Whether or not this wheel speed is in the process of increasing can be determined by whether the wheel acceleration is positive or negative.

When a holding output is set, the valve positions of the respective valves are made the positions according to the solenoid drive pattern (B) shown in FIG. 13. That is, the front wheel first and second control valves 14, 15, the front wheel differential pressure control valve 6, the rear wheel differential pressure control valve 36 and the rear wheel control valve 44 are all made off-state and the second pressure increase control valve 8 is closed, whereby the W/C pressure acting on the left front wheel 52 is held.

If in step 604 the wheel speed in the left front wheel 52 is not increasing, a decreasing output is set. When the decreasing output is set, the valve positions of the respective valves are set according to the solenoid drive pattern (C) shown in FIG. 13. That is, the second pressure increase control valve 8 is closed and the second pressure decrease control valve 12 is opened. Therefore, by brake fluid being discharged into the ABS control use reservoir 10 through the conduit B the W/C pressure is reduced and increase of the wheel speed in the left front wheel 52 is promoted. Then, brake fluid having collected in the ABS control use reservoir 10 is drawn by the front wheel pump 9 and that brake fluid is made to counterflow into the conduit A.

When the ABS control processing of this time controlled wheel ends, ABS control processing of another wheel is then carried out.

As described above, in the respective processings of TRC control, sideslip prevention control and ABS control, only one pump for drawing brake fluid inside the hydraulic pressure circuit can be provided for each of the front and rear wheel piping systems. By this means it is possible to reduce the cost of the brake system.

In this embodiment, a brake system in a front-rear piping arrangement was shown, but it is not limited to this and may also be applied to an X (diagonal) piping arrangement.

Also, although in this embodiment the invention was applied to a rear wheel drive vehicle, it is not limited to this and may alternatively be applied to a front wheel drive vehicle or a four wheel drive vehicle.

When applying the present invention to a brake system of an X piping arrangement or to a front wheel drive vehicle or a four wheel drive vehicle, it is only necessary to change the control method of the respective valves described above.

For example, in a case where the brake system of FIG. 1 is applied to a front wheel drive vehicle, it is naturally necessary for the TRC control to apply a braking force to the front wheels, which are the driving wheels. Therefore, the front wheel differential pressure control valve 6 is made on-state (differential pressure producing state), the front wheel first and second control valves 14, 15 are made on-state (open state), and the first and second pressure increase control valves 7, 8 are made off-state (open state). Brake fluid is drawn by the pump 9 through the conduit D from the master cylinder 2 and the master reservoir 3. The drawn brake fluid is delivered into the conduit A to produce a braking force on the two front wheels. Besides this, it is also possible to execute sideslip prevention control and ABS control by changing the control method of the respective valves.

According to the brake system in this embodiment, by feeding brake fluid to the primary chamber 2A of the master cylinder 2 with the delivery of the front wheel pump 9, the master cylinder 2 is used as regulating device (a regulator). That is, the master cylinder 2 plays the role of making the brake fluid pressure in the front wheel piping system and the brake fluid pressure in the rear wheel piping system roughly the same. Consequently, it is also possible to carry out the following kind of braking operations.

Firstly, an example wherein the master cylinder 2 is used as a regulating device during non-braking will be given. For example, in sideslip prevention control described above, the master cylinder 2 can produce approximately the same brake fluid pressure not only in the front wheel side but also in the rear wheel side during non-braking when the brake fluid pressure of the front wheel side is transmitted to the rear wheel side through the master cylinder 2. That is, the same pressure arises in the primary chamber and the secondary chamber as the result that brake fluid is fed to the primary chamber 2A of the master cylinder 2.

This function of the master cylinder 2 is also useful in automatic brakes used for keeping a substantially constant inter-vehicle distance during non-braking and automatic brakes used in constant speed travel devices for realizing constant speed travel on hills and the like.

As an example, suppose that only the front wheel pump is driven and the rear wheel pump is not driven when applying an automatic brake in this brake system. At this time, the front wheel first control valve 14 is closed and the front wheel second control valve 15 is opened, and the other valves are brought to the valve positions in the normal braking state (the valve positions of FIG. 1). If this is done, brake fluid that the front wheel pump 9 has drawn from the master reservoir 3 is delivered to the primary chamber 2A and the wheel cylinders of the left and right front wheels 51, 52, and a predetermined brake fluid pressure P1 is produced in the primary chamber 2A by the orifice effect of the passage connecting the primary chamber 2A and the master reservoir 3. This predetermined brake fluid pressure P1 is also transmitted to the secondary chamber 2B of the master cylinder 2 and the pressure of the secondary chamber 2B also becomes the predetermined brake fluid pressure P1. Thus, it is possible to apply substantially the same brake pressure to wheel cylinders of all the wheels by only driving the front wheel pump 9. At this time, because excess brake fluid escapes through the passages serving as the orifice to the master reservoir 3, it is possible to keep each wheel cylinder pressure (the pressure produced in the master cylinder) down to a pressure of about 10 kgf/mm$^2$ or less which is not considered large.

Considering the front-rear braking force distribution, in a vehicle wherein the wheel cylinder cross-sectional area on the rear wheel side is set smaller than the wheel cylinder cross-sectional area on the front wheel side or a vehicle in which is disposed a proportioning valve for pressure-attenuating the M/C pressure while transmitting it to the rear wheel side, it is possible to satisfy a front wheel leading lock even when an equal brake fluid pressure is applied to the front and rear wheel cylinders.

As the regulating action of the master cylinder 2 during non-braking the following things are also conceivable. For example, in the piping construction shown in FIG. 1, although in FIG. 1 the second conduit D2 was provided on the front wheel side only, a conduit and a valve equivalent to this second conduit D2 and the front wheel second control valve 15 can be provided on the rear wheel side also. Furthermore, both the front wheel pump 9 and the rear wheel pump 39 can be made self-supplying pumps. When this kind of piping construction is used, for example, it will be supposed that in automatic braking during non-braking, both of the front wheel and rear wheel pumps 9, 39 are driven and also the front wheel second control valve 15 and the rear wheel second control valve equivalent to this are opened. As a result, a brake fluid pressure is applied to the wheel cylinders of all the wheels. At this time, it will be supposed that the front wheel differential pressure control valve 6 and the rear wheel differential pressure control valve 36 are made differential pressure producing state, and therefore the master cylinder 2 and the wheel cylinders on the front wheel side and the wheel cylinders on the rear wheel side are essentially cut off. When this is done, as a result of a difference in the drawing and delivering performance of the front wheel pump 9 and the rear wheel pump 39 due to an assembly error or some other reason, there is not always a possibility of the wheel cylinder pressure of the front wheel side and the wheel cylinder pressure of the rear wheel side becoming substantially the same. Consequently, if the delivery performance of the pump on the rear wheel side is large, a possibility of rear wheel leading lock occurring also exists.

However, as in the above described embodiment, in automatic braking during non-braking, when both of the front wheel and rear wheel pumps 9, 39 are driven and the front wheel second control valve 15 and the rear wheel second control valve equivalent to this are opened and a brake fluid pressure is applied to the wheel cylinders of all the wheels, if both the front wheel differential pressure control valve 6 and the rear wheel differential pressure control valve 36 are open and the primary chamber 2A and the secondary chamber 2B of the master cylinder 2 and the main conduit D1 to the front wheel side wheel cylinders and the main conduit to the rear wheel side wheel cylinders are opened respectively, the master cylinder 2 fulfills the role of the regulating device. That is, it is possible to apply substantially the same brake fluid pressure to the wheel cylinders of the front wheel side and the rear wheel side. That is, in the primary chamber 2A and the secondary chamber 2B of the master cylinder 2, it is possible to make the brake fluid pressures of the front wheel side and the rear wheel side piping systems the same. Further, not only when it is necessary to apply substantially the same brake fluid pressure to the wheel cylinders of all the wheels, if the master cylinder 2 is used as the regulating device it is possible to make at least one of the wheel cylinders of the front wheel side and at least one of the wheel cylinders of the rear wheel side substantially the same pressure.

If the W/C pressure during automatic braking and non-braking is detected by the pressure sensor 50 and the front wheel pump 9 and the front wheel second control valve 15 are on-off duty controlled on the basis of this detection result, it is also possible to carry out regulation of the W/C pressure during automatic braking.

Secondly, an example wherein the master cylinder 2 is used as the regulating device during braking will be given. By regulating the master cylinder 2 during braking, shown in FIG. 1, an M/C pressure produced in the primary chamber 2A due to brake fluid amount drawn from the master reservoir 3 by the front wheel pump 9 can be regulated in response to the driver applying the brake pedal 1. This regulation of the M/C pressure produced by the front wheel pump 9 in response to the brake stepping force will be described on the basis of the master cylinder 2 operation diagram shown in FIGS. 14A to 14D. The x signs in the diagrams show pedal operation amount (pedal stepping stroke) of the driver.

Figure 14A:
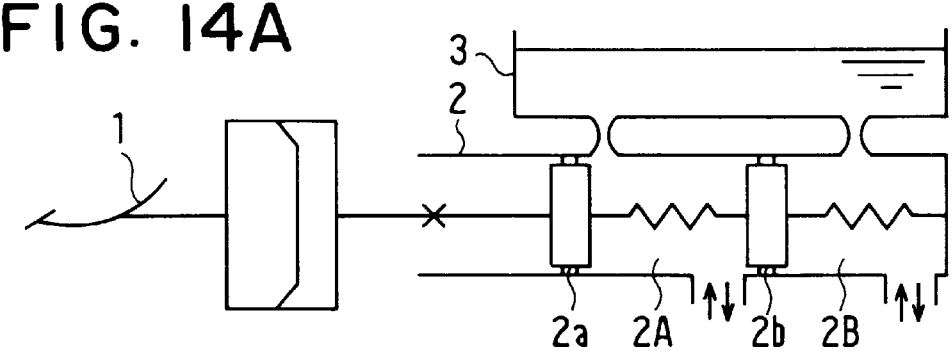
FIGS. 14A, 14B, 14C, and 14D are schematic views for explaining an operation of a master cylinder.

First, when the brake pedal 1 is not applied by the driver, as shown in FIG. 14A, the pressures in the primary chamber 2A and the secondary chamber 2B are substantially equal. Because the master reservoir 3 is open to the atmospheric pressure, the pressures in the primary and secondary chambers 2A, 2B are roughly one atmosphere.

Figure 14B:
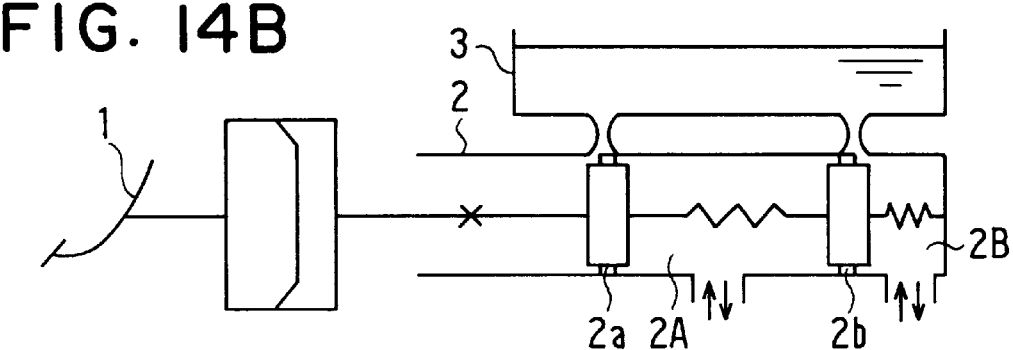
Figure 14C:
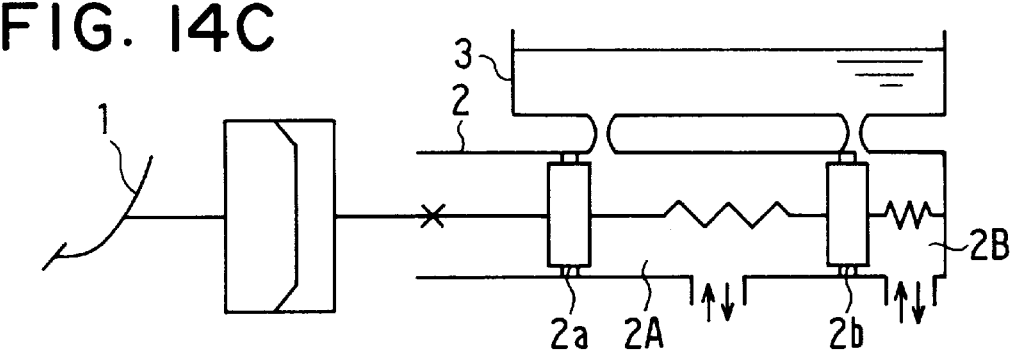

Next, if the front wheel pump 9 is operates according to the application of the brake pedal 1 by the driver, brake fluid delivered from the front wheel pump 9 flows into the primary chamber 2A. A pressure arises as a result of this brake fluid amount having flowed in. As shown in FIGS. 14B, 14C the master pistons 2a, 2b forming the primary chamber 2A mutually move to depart from each other. The amount of brake fluid which the front wheel pump 9 draws from the master reservoir 3 and delivers to the primary chamber 2A will be assumed to be substantially constant with respect to time.

When the stepping force of the brake pedal is large with respect to the brake fluid amount delivered from the front wheel pump 9 to the primary chamber 2A, the passage connecting the master cylinder 2 and the master reservoir 3 is blocked by the pedal side master piston 2a which is pushed in by the pedal stepping force. As a result, an M/C pressure corresponding with the brake pedal stepping force (brake pedal stroke) is produced with the use of the brake fluid amount sent by the front wheel pump 9. The brake fluid pressure of the primary chamber 2A and the brake fluid pressure of the secondary chamber 2B become equal pressures.

When, on the other hand, the pressure of the primary chamber 2A due to the brake fluid delivery of the front wheel pump 9 is relatively large compared with the pedal stepping force, in other words when the amount of brake fluid sent from the front wheel pump 9 is relatively large, the master piston 2a moves to the brake pedal 1 side so that the brake pedal 1 is returned by a high M/C pressure. As a result, the passage connecting the master cylinder 2 and the master reservoir 3 becomes open and excess brake fluid is allowed to escape. Because of this, the brake fluid pressure of the primary chamber 2A is regulated to a pressure corresponding to the pedal stepping force. Consequently, at the same time, the secondary chamber 2B is also regulated to a pressure corresponding to the pedal stepping force.

By the brake fluid amount sent from the front wheel pump 9 to the primary chamber 2A, which is adjusted by the passage connecting the master cylinder 2 and the master reservoir 3 and the master piston 2a as described above, it is possible to produce M/C pressure corresponding to the pedal stepping force with a relatively small brake pedal stroke.

Figure 14D:
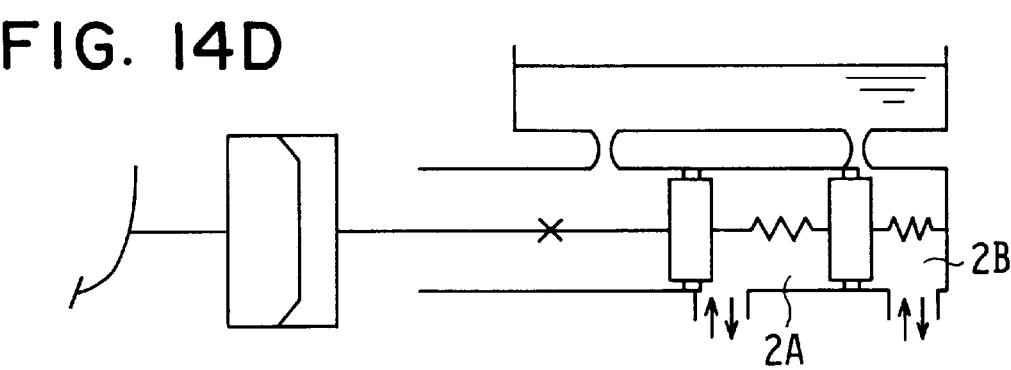

FIG. 14D illustrates a view of the operation of a master cylinder in a conventional brake system. This view shows a state in which the master pistons have moved as a result of applying the brake pedal. When the pedal stroke amount of this conventional brake system shown in FIG. 14D is compared to the brake system in the embodiment shown in FIGS. 14B and 14C, it can be seen that the pedal stroke amount is larger with the conventional brake system. This is because the volume of the primary chamber 2A increases in the present embodiment due to the brake fluid sent from the front wheel pump 9 to the primary chamber 2A. As a result, the master pistons 2a, 2b move apart from each other and the master piston 2a of the brake pedal 1 side approaches the brake pedal 1. If brake fluid is sent to the primary chamber 2A as described above and the pressure in the primary chamber 2A is regulated corresponding to the pedal stepping force with the use of the brake fluid sent from the front wheel pump 9, even when the pedal stroke amount is small an M/C pressure corresponding to the pedal stepping force can be produced. Therefore, it is possible to make the pedal stroke amount small. At this time it is possible to made the brake fluid pressure with respect to the front wheel side piping system and the brake fluid pressure with respect to the rear wheel side piping system substantially equal.

That is, to produce a required M/C pressure, the driver applies the brake pedal 1. However, in a conventional brake system because the M/C pressure is simply produced corresponding to the pedal stroke amount, a long pedal stroke is necessary to produce a high M/C pressure. Consequently, with a conventional brake system it has not been possible to satisfy the requirement of producing a high M/C pressure even if the pedal stroke is short. In contrast to the conventional brake system, the brake system of this embodiment satisfies the need for a high M/C pressure with a short pedal stroke.

Further, the discharge port of the front wheel pump 9 and the primary chamber 2A are directly connected and brake fluid discharged from the front wheel pump 9 is directly sent to the primary chamber 2A. Even if excess brake fluid is sent to the primary chamber 2A, this brake fluid counterflows to the master reservoir 3 through the orifice of the passage connecting the master cylinder 2 and the master reservoir 3. Because of this, when brake fluid that the pump has drawn in sideslip prevention control or the like counterflows to the master reservoir 3, moderately increase and decrease of the M/C pressure can be carried out.

FIG. 15 illustrates an example of the steps in regulation control when the master cylinder 2 is used as a regulating device. As described above, this regulation control has the object of shortening the stroke of the brake pedal even when a high M/C pressure is to be produced. Therefore, independently from ABS control, sideslip prevention control or TRC control, the following processing of regulation control may be carried out.

As shown in FIG. 15, in a step 701, using a brake switch (not shown), it is determined whether or not the brake pedal 1 has been applied by the driver and the vehicle is essentially in a braking state. When the brake pedal 1 is being applied, the front wheel pump 9 is driven in step 702. Also, in step 703, the front wheel second control valve 15 is opened. When, in step 701, it is determined that the brake is not being applied, the pump drive and the front wheel second control valve 15 drive are stopped in step 704. By this means, during braking by the brake pedal by the driver 1, the brake fluid amount is drawn from the master reservoir 3 and delivered to the primary chamber 2 by the front wheel pump 9. As a result, brake fluid pressure is regulated in the primary chamber 2A to be consistent with the pedal stepping force while the master piston 2b make a stroke by essentially only the volume of the secondary chamber 2B. That is, when the pedal stepping force is increased, a suitable pressure is produced in the primary chamber 2A by the brake fluid amount delivered from the front wheel pump 9.

In this regulating action of the primary chamber 2A of the master cylinder 2 during braking, and as shown in the piping construction of FIG. 1, the second conduit D2 is provided only on the front wheel side. However, a conduit and a valve equivalent to this second conduit D2 and the front wheel second control valve 15 may also be provided for the rear wheels and both the front wheel pump 9 and the rear wheel pump 39 made self-supplying pumps. In this case, in response to the brake switch of step 701 being ON (the brake is applied), both the front wheel pump 9 and the rear wheel pump 39 are driven and also the front wheel second control valve 15 and the valve for the rear wheels equivalent to the front wheel second control valve 15 are opened. If this is done, it is possible to regulate brake fluid pressure in both the primary chamber 2A and the secondary chamber 2B to be inconsistent with the pedal stepping force while using the brake fluid amounts delivered by both of the pumps 9, 39. Consequently, it is possible to further shorten the pedal stroke compared to when a second conduit D2 is provided only in the front wheel side piping system and regulation is carried out in only the primary chamber 2A as shown in FIG. 1. In this case, since the master cylinder 2 goes through as a regulating device it is possible to make the front wheel side piping system and the rear wheel side piping system substantially the same pressure.

This embodiment describes an example wherein the invention is applied to a brake system having a master cylinder 2 made up of two chambers that are the primary chamber 2A and the secondary chamber 2B. However, the invention may also be applied to a brake system comprising a regulator and one chamber like a hydraulic booster. In this case, if the throttling of a passage connecting the regulator with the reservoir is utilized to give a hydraulic pressure to a regulator system, it is possible to obtain the same effects as the embodiment described above.

Irrespective of the brake piping system of the front and rear piping arrangements, the present invention may also be applied to a brake piping system having an X piping arrangement.

During non-braking, when the driver does not apply the brake pedal, when a brake fluid pressure is applied to the wheel cylinders by automatic braking, the flow chart in FIG. 15 can be modified as follows. Instead of determining whether or not the brake switch is ON in step 701, it is determined whether or not automatic braking in sideslip prevention control, constant speed travel control during non-braking or the like has been executed. When an affirmative determination is made processing proceeds to step 702 and when a negative determination is made processing proceeds to step 704. Naturally, it may also be applied to control during braking in the sideslip prevention control described above.

In the embodiment described above, a brake system may be constructed so that a pedal stepping force of the driver is mechanically transmitted to the master piston 2a via a servo device (booster) through a rod connected to the brake pedal. Further, the present invention can also be applied to a so-called brake-by-wire system wherein a pedal stepping force or stroke from the driver is converted into an electrical signal and an actuator (specifically a pump or a hydraulic booster or the like) receiving this electrical signal produces a pressure in the master cylinder equal to the amount of the pedal stepping force or stroke from the driver.

[Second Embodiment]

Figure 16:
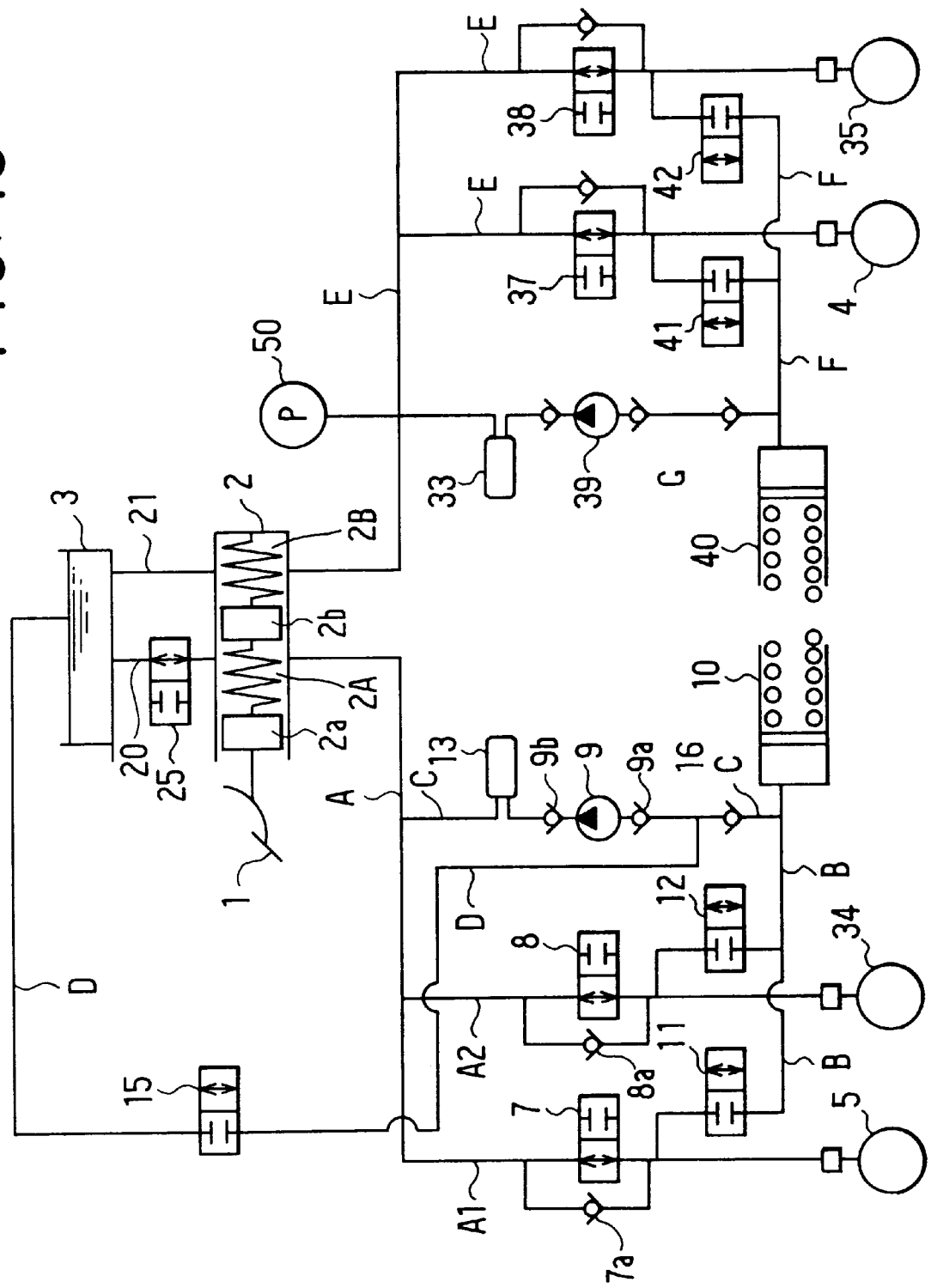
FIG. 16 is a hydraulic circuit diagram of a brake system in a second embodiment of the present invention.

Next, the second embodiment of the present invention will be described. FIG. 16 is a brake piping diagram in a brake system, and this brake system has a sideslip prevention system and an ABS.

The brake system shown in FIG. 16 is a brake system applied to a rear wheel drive four wheeled vehicle having two piping systems (x piping system) consisting of a first piping system for controlling brakes of the left front wheel and the right rear wheel and a second piping system for controlling brakes of the right front wheel and the left rear wheel.

As shown in FIG. 16, a brake pedal 1 stepped on by a driver to apply a braking force to the vehicle is connected to a master cylinder 2 constituting a brake fluid pressure producing source. When the driver steps on the brake pedal 1, master pistons 2a, 2b disposed in the master cylinder 2 are pushed thereby producing a master cylinder pressure ("the M/C pressure").

This master cylinder 2 is divided into two rooms that are a primary chamber 2A and a secondary chamber 2B. A primary chamber 2A side produces a brake fluid pressure to be transmitted to the first piping system and a secondary chamber 2B side produces a brake fluid pressure to be transmitted to the second piping system. To the master cylinder 2 is provided a master reservoir 3 having connecting passages 20, 21 respectively connecting with the two rooms of the master cylinder 2. The master reservoir 3 supplies brake fluid to the master cylinder 2 and receives excess brake fluid inside the master cylinder 2 through the connecting passages 20, 21.

A first control valve (connection control valve) 25 for controlling connection and disconnection of the primary chamber 2A of the master cylinder 2 and the master reservoir 3 is provided in the connecting passage 20 connecting the primary chamber 2A and the master reservoir 3. By means of the first control valve 25, high-pressurization of the primary chamber 2a is made possible.

An M/C pressure produced by the application of the brake pedal by the driver is transmitted to the first piping system and the second piping system. Because the first piping system and the second piping system are of substantially the same construction, the first piping system only will be described. With respect to the second piping system, only construction differing from the first piping system will be described.

The first piping system comprises conduit A constituting a main conduit for transmitting the above-mentioned M/C pressure to wheel braking force producing devices, namely a wheel cylinder 5 for the left front wheel and a wheel cylinder 34 for the right rear wheel. As a result, wheel cylinder pressures ("W/C pressures") are produced in the wheel cylinders 5, 34.

Specifically, the conduit A branches into two conduits A1, A2, and the conduit A1 transmits brake fluid to the wheel cylinder 5, and the conduit A2 transmits brake fluid to the wheel cylinder 34. In the conduit A1 a first pressure increase control valve 7 for controlling pressure increase to the wheel cylinder 5 is provided. In the conduit A2 a second pressure increase control valve 8 for controlling pressure increase to the wheel cylinder 34 is provided. These first and second pressure increase control valves 7, 8 are two-position valves which can be controlled between open and closed states. When these first and second pressure increase control valves 7, 8 are controlled to their open states, an M/C pressure or a brake fluid pressure produced by delivery of brake fluid of a first pump 9 which will be further discussed later can be applied to the wheel cylinders 5, 34.

At a time of normal braking ("during normal braking") arising from the driver applying a brake pedal, the first and second pressure increase control valves 7, 8 are always controlled to be opened. Safety valves 7a, 8a are disposed in parallel with the first and second pressure increase control valves 7, 8 respectively so that when brake pedal stepping is stopped and ABS control has finished brake fluid can be promptly removed from the wheel cylinders 5, 34. In a conduit B connecting the conduits A1, A2 between the first and second pressure increase control valves 7, 8 and the wheel cylinders 5, 34 to an ABS control use reservoir 10, a first pressure decrease control valve 11 and a second pressure decrease control valve 12 are respectively disposed. These first and second pressure decrease control valves 11, 12 are constructed as two-position valves which can be controlled between open and closed states. During normal braking these first and second pressure decrease control valves 11, 12 are always closed.

In a conduit C connecting the conduit A between the master cylinder 2 and the first and second pressure increase control valves 7, 8 to the ABS control use reservoir 10, a first pump 9 is disposed with safety valves 9a, 9b on either side. By means of this first pump 9, drawing and delivery of brake fluid is carried out. Also, to moderate pulsation of brake fluid that the first pump 9 delivers, in the conduit C on the delivery side of the first pump 9, a first damper 13 of a fixed capacity is disposed.

A conduit D is connected to the conduit C between the ABS control use reservoir 10 and the first pump 9. This conduit D is connected to the master reservoir 3. A second control valve 15 is provided in this conduit D. This second control valve 15 is constructed as a two-position valve which can be controlled between open and closed states, and during normal braking is always closed. Through this conduit D the above-mentioned first pump 9 can draw brake fluid from inside the master reservoir 3 and deliver it toward the conduit A. That is, during sideslip prevention control and the like, the first pump 9 draws brake fluid from the master reservoir 3 and can carry out supply of brake fluid. A nonreturn valve 16 is disposed between the ABS control reservoir 10 and the point of connection between the conduit D and the conduit C so that brake fluid does not escape into the ABS control use reservoir 10 through the conduit D.

The second piping system is of almost the same construction as the first piping system. That is, the first and second pressure increase control valves 7, 8 respectively correspond to third and fourth pressure increase control valves 37, 38 and the first and second pressure decrease control valves 11, 12 correspond to third and fourth pressure decrease control valves 41, 42. The wheel cylinders 5, 34 respectively correspond to wheel cylinders 4, 35, the ABS control use reservoir 10 corresponds to an ABS control use reservoir 40, the first pump 9 corresponds to a second pump 39 and the first damper 13 corresponds to a second damper 33. Also, the conduit A, the conduit B and the conduit C correspond to a conduit E, a conduit F and a conduit G.

However, in the second piping system, a conduit corresponding to the conduit D is not provided. Also, in the conduit E in the vicinity of the master cylinder 2, a pressure sensor (pressure detecting device) 50 which can detect a brake fluid pressure is disposed.

Figure 17:
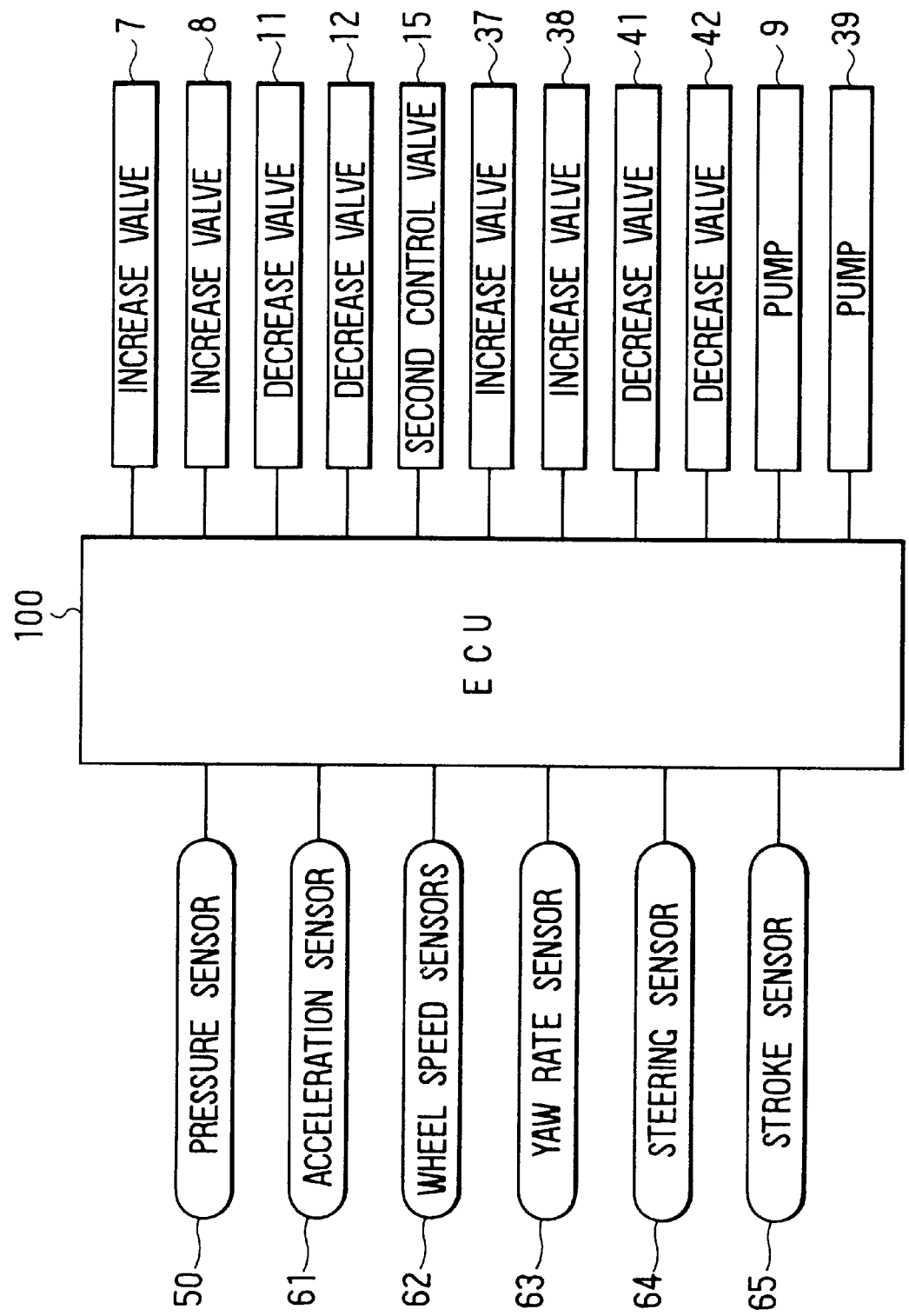
FIG. 17 is a schematic view of an electronic control unit of the brake system shown in FIG. 1.

Next, in FIG. 17, the construction of a brake system electronic control unit ("the ECU") 100 is shown. As shown in the figure, various detection signals are sent from the pressure sensor 50 to the brake system ECU: an acceleration sensor 61, wheel speed sensors 62, a yaw rate sensor 63, a steering sensor 64 and a stroke sensor 65. On the basis of these detection signals, the ECU 100 controls opening and closing of the various control valves disposed in the first and second piping systems.

Figure 18:
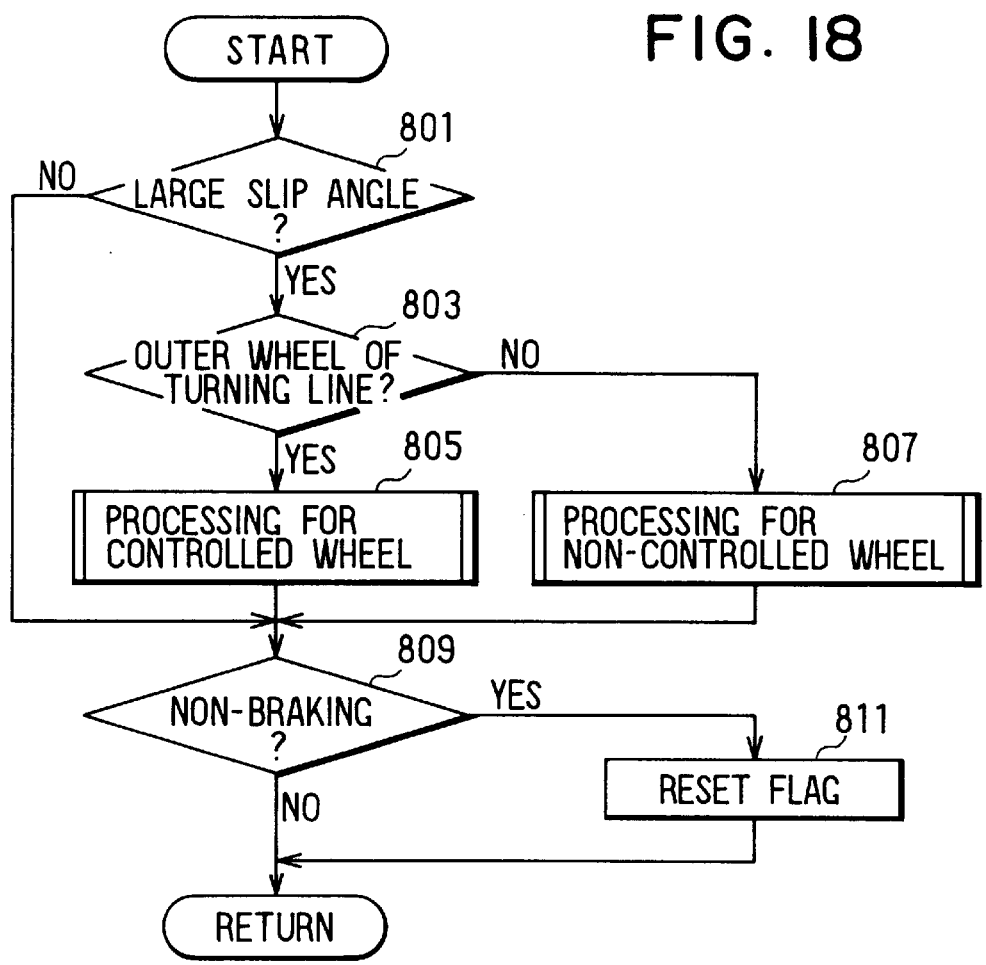
FIG. 18 is a flow chart illustrating sideslip prevention control.
Figure 19:
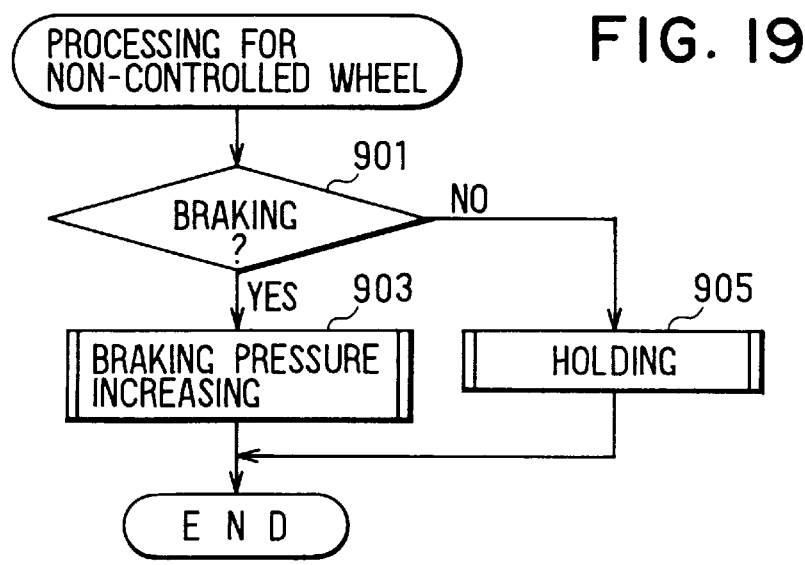
FIG. 19 is a flow chart showing processing for a non-controlled wheel in sideslip prevention control.

Next, sideslip prevention control will be described on the basis of the flow charts shown in FIG. 18 through FIG. 20. FIG. 18 is a flow chart showing the overall sideslip prevention control, FIG. 19 is a flow chart showing control of a non-controlled wheel in sideslip prevention control, and FIG. 20 is a flow chart showing control of an controlled wheel in sideslip prevention control.

First, the overall processing of sideslip prevention control shown in FIG. 3 will be described. This processing is carried out wheel by wheel. For example, when processing ends for the left front wheel, processing is then carried out for the right rear wheel. When processing finishes for all the wheels, processing for the left front wheel is carried out again.

In this sideslip prevention control, when the vehicle is in an oversteering state during turning, the oversteering state is cancelled by applying a braking force to either of the left and right front wheels according to the direction of the turn.

For example, as shown in FIG. 7, when the vehicle is turning to the left and oversteering by the driver causes the actual turning pattern of the vehicle to vary from the target path, as shown by the hatched part in the figure, a braking force may be applied to the right front wheel 51.

With respect to an oversteering state in a case of turning to the right, the oversteering state may be cancelled by applying a braking force to the left front wheel 52. When the vehicle has entered an understeering state, the degree of the understeering state is reduced by applying braking forces to both of the rear wheels 53, 54 The following description discusses a case wherein the kind of oversteering state shown in FIG. 6 has occurred and sideslip prevention control for applying a braking force to the right front wheel 51 is carried out.

In step 801, the starting conditions of sideslip prevention control are determined. That is, it is determined whether or not a sideslip angle of the vehicle is greater than a predetermined angle. This sideslip angle is obtained as a difference between an actual vehicle turn angle obtained from a yaw rate detected by the yaw rate sensor 63 and a target turn angle set from a steering angle detected by the steering sensor 64 and a vehicle speed detected by wheel speed sensors 62.

If in step 801 the determination is YES, processing proceeds to step 803. If in step 801, it is NO, processing proceeds to step 809 which determines whether or not the driver is not applying the brake pedal 1. If the determination in step 809 is YES, processing proceeds to step 811 and resets a braking determination flag which will be further discussed later.

In step 803, determination of whether or not the wheel currently being processed is the outer wheel of the turning line is carried out. At the time of the oversteering state shown in FIG. 7, because the sideslip prevention controlled wheel is the right front wheel 51 which is the outer wheel of the turning line, processing proceeds to step 805. For the other wheels, processing proceeds to step 807. Concerning the right front wheel 51, after processing for a controlled wheel is carried out in step 805, processing proceeds to step 809. Concerning the wheels other than the right front wheel 51, after processing for a non-controlled wheel is carried out in step 807, processing proceeds to step 809.

In step 809, whether or not braking is in progress is determined. Whether or not braking is in progress is determined on the basis of the M/C pressure detected by the pressure sensor 50. That is, when a pressure increasing output command (discussed below) has not been issued with respect to the controlled wheel, unless the driver steps on the brake pedal 1, the M/C pressure does not increase. Therefore, when a pressure increasing output command has not been issued and when the M/C pressure increases, a braking determination flag is set and it is deemed that braking is in progress.

Since the brake system in this embodiment is of the construction shown in FIG. 16 and normally the master cylinder 2 and the wheel cylinders 4, 5, 34, 35 are always connected, the M/C pressure and the wheel cylinder pressure are substantially the same. Consequently, if the above-mentioned braking determination is carried out on the basis of the M/C pressure, it is possible to carry out control corresponding to the W/C pressure. That is, because it is possible to estimate the road surface friction coefficient (road surface $\mu$) on the basis of the W/C pressure, control corresponding to the road surface $\mu$ is possible by carrying out control on the basis of the M/C pressure substantially equal to the W/C pressure.

In step 809, if braking is not in progress, the braking determination flag is reset in step 811 and processing of the wheel for which processing is currently being carried out is ended and processing shifts to another wheel. If in step 809 braking is in progress, processing of the wheel for which processing is currently being carried out is ended directly and processing shifts to another wheel.

Next, control of a controlled wheel and control of a non-controlled wheel will be described on the basis of FIG. 19 and FIG. 20. Here, the description will be divided according to whether the vehicle is in the process of braking or not in the process of braking.

(Processing During Non-braking)
(1) Processing in Non-controlled Wheel

In step 901, whether or not braking is in progress is determined. This determination is made by whether or not the above-mentioned braking determination flag has been set. Because this example is now during non-braking, the determination of step 901 is NO and processing proceeds to step 905 which sets a pressure-holding output and ends processing.

When this holding output is set, the brake system ECU drives solenoids of the control valves corresponding to the non-controlled wheels (for example if it is the left front wheel 52 the first pressure increase control valve 7 and the pressure decrease control valve 11 corresponding to the wheel cylinder 5 in the left front wheel 52), and moves their valve positions to the solenoid drive pattern (C) shown in FIG. 21. That is, when a holding output is set, the pressure increase control valve is brought to its on-state (closed state), the pressure decrease control valve to its off-state (closed state), the first control valve 25 to its on-state (closed state), and the second control valve 15 to its off-state (closed state). However, during non-braking, if the valve states of the first control valve 25 and the second control valve 15 according to the solenoid drive pattern (C) for the non-controlled wheel is different from those according to the solenoid drive pattern for the controlled wheel, the valve states of the first control valve 25 and the second control valve 15 is determined based on the solenoid drive pattern for the controlled wheel. In other words, the solenoid drive pattern set for the controlled wheel has priority over the solenoid drive pattern set for the non-controlled wheel with respect to the valve states of the first and second control valves 25, 15 during non-braking.

(2) Processing in Controlled Wheel

In step 1001, whether or not braking is in progress is determined. This determination is the same as that for the non-controlled. If the determination is NO, then processing proceeds to step 1003 for non-braking processing.

In step 1003, it is determined whether or not the actual wheel speed of the controlled wheel (here, the right front wheel 51) is larger than a target wheel speed. This target wheel speed is set as a wheel speed corresponding to the current slip angle state. At this moment, it is determined whether or not the actual wheel speed of the right front wheel 51 is greater than this target wheel speed.

Then, when in step 1003 the determination is YES, pressure increasing output processing is carried out to make the actual wheel speed approach the target wheel speed and processing is ended. When this pressure increasing output command is issued, the ECU drives solenoids of the control valves corresponding to the controlled wheel and moves the valve members of the control valves to the valve positions of the solenoid drive pattern (A) shown in FIG. 21. That is, when the pressure increasing output command is set, the third pressure increase control valve 37 corresponding to the right front wheel 51 is brought to its off-state (open state), the third pressure decrease control valve 41 to its off-state (closed-state), the first control valve 25 to its on-state (closed state) and the second control valve 15 to its on-state (open state).

When this pressure increasing output command is issued the first pump 9 is driven. When the first pump 9 is driven brake fluid from inside the master reservoir 3 is drawn through the conduit D and this drawn brake fluid is delivered to the conduit A.

Because as mentioned above the pressure increase control valves 7, 8, 38 of the non-controlled wheel are in their on-states (closed states), the brake fluid delivered to the conduit A is supplied to the primary chamber 2a of the master cylinder 2 and increases the brake fluid pressure in the primary chamber 2a. At this time, because the master reservoir 3 and the primary chamber 2a are cut off from each other by the first control valve 25 between the master reservoir 3 and the primary chamber 2a, the brake fluid supplied into the primary chamber 2a cannot escape to the master reservoir 3. Therefore, the brake fluid pressure of the primary chamber 2a increases greatly.

Also, due to the increase in pressure of the primary chamber 2A, the master pistons 2a, 2b inside the master cylinder 2 move. The brake fluid pressure inside the secondary chamber 2b increases due to the movement of the master pistons 2a, 2b. This increased brake fluid pressure is given to the wheel cylinder 4 corresponding to the controlled wheel (the right front wheel 51) through the conduit E to increase the W/C pressure thereof. As a result, it is possible to increase the W/C pressure of the wheel cylinder corresponding to the controlled wheel in the second piping system without driving the second pump 39.

When the determination in step 1003 is NO, processing proceeds to step 1005 and determines whether or not the actual wheel speed in the controlled wheel (the right front wheel 51) is smaller than the target wheel speed. When in step 1005 the determination is YES, a pressure decreasing output command is issued and processing ends. When this pressure decreasing output command issues, the ECU drives solenoids of the control valves corresponding to the controlled wheel and moves the valve members of the control valves to the valve positions of the solenoid drive pattern (B) shown in FIG. 21. That is, when the pressure decreasing output command is set, the third pressure increase control valve 37 corresponding to the right front wheel 51 is brought to its on-state (closed state) and the third pressure decrease control valve 41 to its on-state (open state), and the first control valve 25 is brought to its off-state (open state) and the second control valve 15 to its off-state (closed state).

As a result, brake fluid creating the W/C pressure is allowed to escape to the ABS control use reservoir 40 through the conduit F which is opened by the third pressure decrease control valve 41. As a result, the W/C pressure in the right front wheel 51 is decreased and the actual wheel speed of the right front wheel 51 is made to approach the target wheel speed. It is to be noted that the second pump 39 takes in brake fluid discharged in the ABS control use reservoir 40 and returns the brake fluid into the conduit E.

When the determination in step 1005 is NO, a holding output command issues and processing ends. When this holding output command issues, the ECU 100 drives solenoids of control valves corresponding to the controlled wheel and moves the valve members of the control valves to the valve positions of the solenoid drive pattern (C) shown in FIG. 21. That is, when the holding output command is set, the third pressure increase control valve 37 is brought to its on-state (closed state) and the third pressure decrease control valve 41 to its off-state (closed state), and the first control valve 25 is brought to its on-state (closed state) and the second control valve 15 to its off-state (closed state) so they are all brought to their closed states.

By this means, the W/C pressure in the right front wheel 51 is kept unchanged in its present state. That is, because the actual wheel speed of the right front wheel 51 is the same as the target wheel speed, control to maintain this wheel speed is carried out.

(Processing During Braking)
(1) Processing in Non-controlled Wheel

In step 901, because braking is in progress, the determination is YES and processing proceeds to step 203 and a braking pressure increasing output command is set and processing ends.

When this braking pressure increasing output command is set, the ECU 100 drives the solenoids of the control valves corresponding to the non-controlled wheels and moves the valve members of the control valves to the valve positions of the solenoid drive pattern (D) shown in FIG. 21. That is, when the braking pressure increasing output command is set, the pressure increase control valves are brought to the off-state (open state), the pressure decrease control valves to the off-state (closed state), the first control valve 25 to the off-state (open state) and the second control valve 15 to the off-state (closed state).

Because of this, when the M/C pressure increases as a result of operation of the brake pedal 1 by the driver, the W/C pressures of the non-controlled wheels are increased through the pressure increase control valves.

(2) Processing in Controlled Wheel

In step 1001, because braking is in progress, the determination is YES and processing proceeds to step 1013. In step 1013, it is determined whether or not the actual wheel speed of the controlled wheel (the right front wheel 51) is larger than a target wheel speed. When in step 1013 the determination is YES, a braking pressure increasing output command issues to make the actual wheel speed approach the target wheel speed and processing ends. When this braking pressure increasing output command is set, the ECU 100 drives solenoids of the control valves corresponding to the controlled wheel and moves the valve members of the control valves to the valve positions of the solenoid drive pattern (D) shown in FIG. 21. That is, when the braking pressure increasing output command is issued, the third pressure increase control valve 37 corresponding to the right front wheel 51 is brought to its off-state (open state), the-third pressure decrease control valve 41 to its off-state (closed state), the first control valve 25 to its off-state (open state), and the second control valve 15 to its off-state (closed state).

That is, when the braking pressure increasing output command issues, increasing of the W/C pressure in the right front wheel 51 is carried out using the M/C pressure increased by the operation of the brake pedal 1 by the driver. In other words, rather than increasing the W/C pressure of the controlled wheel by driving the first pump 9 the W/C pressure is increased by the operation of the brake pedal 1 by the driver.

When in step 1013 the determination is NO, processing proceeds to step 1015 and determines whether or not the actual wheel speed in the right front wheel 51 is smaller than the target wheel speed. When in step 1015 the determination is YES, a braking pressure decreasing output command issues at step 1019 and processing ends. When this braking pressure decreasing output command is outputted, the ECU 100 drives solenoids of the control valves corresponding to the controlled wheel and moves the valve members of the control valves to the valve positions of the solenoid drive pattern (E) shown in FIG. 21. That is, when the braking pressure decreasing output command is set, the third pressure increase control valve 37 is brought to its on-state (closed state) and the third pressure decrease control valve 41 to its on-state (open state), the first control valve 25 is brought to its off-state (open state) and the second control valve 15 to its off-state (closed state).

This processing is the same as when a pressure decreasing output is set during non-braking, and decreases the W/C pressure corresponding to the controlled wheel and makes the actual wheel speed of the controlled wheel approach he target wheel speed.

When in step 1015 the determination is NO, a braking holding output command issues at step 1021 and processing ends. When this braking holding output command is set, the ECU 100 drives solenoids of the control valves corresponding to the controlled wheel and moves the valve members of the control valves to the valve positions of the solenoid drive pattern (F) shown in FIG. 21. That is, when the braking holding output command is set, the third pressure increase control valve 37 corresponding to the right front wheel 51 is brought to the on-state (closed state) and the third pressure decrease control valve 41 to its off-state (closed state), and the first control valve 25 is brought to its off-state (open state) and the second control valve 15 to its off-state (closed state). That is, the W/C pressure corresponding to the controlled wheel is kept unchanged at its present state and supply of brake fluid from the master reservoir 3 to the non-controlled wheels is possible.

By providing in the connecting passage 20 connecting the master reservoir 3 and the primary chamber 2A of the master cylinder 2 a first control valve 25 for controlling opening and closing of this connecting passage 20 in this way it is possible to make the brake fluid pressure inside the primary chamber 2A increase greatly just with driving of the first pump 9 in the first piping system. Consequently, during sideslip prevention control, without using the second pump 39 disposed in the second piping system, it is possible to make possible increase of the W/C pressure in the second piping system.

By this means, in sideslip prevention control, because it is possible to eliminate a construction (equivalent to the conduit D and the second control valve 15 in the first piping system) necessary for using a second pump 39 disposed in the second piping system, it is possible to achieve simplification of the piping construction.

Also, because the second pump 39 in the second piping system need only be used for decreasing the W/C pressure, it is not necessary to use a self-supplying pump like the first pump 9 in the first piping system and it is possible to achieve cost reductions.

Also, because braking determination is carried out on the basis of an M/C pressure substantially the same as the W/C pressure, it is possible to carry out sideslip prevention control corresponding to the road surface $\mu$.

With respect to ABS control, by making the pressure decrease control valves 11, 12, 41, 42 provided corresponding to the wheels open-state and allowing brake fluid to escape to the ABS control use reservoir 10, 40, it is possible to carry it out by the same method as conventionally of carrying out pressure reduction of the W/C pressure of the wheel cylinders of the wheels.

The brake system in this embodiment can also carry out traction control. Specifically, when the vehicle is accelerating, if an accelerating slip ratio detected by the wheel speed sensors 62 and the acceleration sensor 61 is above a predetermined value, it is deemed that the vehicle is in a state of accelerating slip. Brake fluid of the master reservoir 3 is drawn by the first pump 9 and the W/C pressure corresponding to the rear wheels, which are the driving wheels, is increased. As a result, a braking force is thereby applied to the driving wheels and it is possible to carry out traction control.

The above description should not be construed as limiting the invention but merely to provide illustrations of some of the present preferred embodiments. Thus the scope of the invention should be determined by the appended claims and their legal equivalents, rather than the example given.

What is claimed is:

1. A brake system comprising a brake fluid pressure producing source;

a reservoir which holds surplus brake fluid;

a plurality of wheel braking force producing devices;

main conduits connecting respectively said brake fluid pressure producing source and each of said wheel braking force producing devices, wherein each of said wheel braking force producing devices receives a brake fluid pressure from said brake fluid pressure producing source and produces a braking force in said at least one wheel;

a braking control detection device which detects a need for braking control of at least one wheel and produces a control signal to control the supply of brake fluid from said brake fluid pressure producing source to one of said wheel braking force producing devices corresponding to said at least one wheel;

a pump device connected to said main conduits;

a first conduit connecting said reservoir and said pump device;

a second conduit connecting said brake fluid pressure producing source and said pump separately from said main conduits;

a first valve device which controls the opening and closing of said first conduit; and a braking control device which, upon receipt of said control signal when the brake fluid pressure of said brake fluid pressure producing source is not substantially produced, opens said first valve device and makes operative said pump device to supply brake fluid through said first conduit to said one of said wheel braking force producing devices, and upon receipt of said control signal when brake fluid pressure of said brake fluid pressure producing source is substantially produced, closing said first valve device and making said pump device operative to supply brake fluid through said second conduit from said brake fluid pressure producing source, in addition to brake fluid primarily supplied through said main conduits from said brake fluid pressure producing source to said one of said wheel braking force producing devices.

2. A brake system according to claim 1, further comprising:
a pressure detecting device which detects a brake fluid pressure in said brake fluid pressure producing source, wherein said braking control device, even when said brake fluid pressure of said brake fluid pressure producing source is produced, if the pressure detected by said pressure producing device is smaller than a predetermined pressure, opens said first valve device by a duty control and said pump device operative and supplies said brake fluid through said first conduit.

3. A brake system according to claim 1, wherein said first valve device allows brake fluid to flow only in a direction from said reservoir to said pump device, even in said open state.

4. A brake system according to claim 1, further comprising:
a second valve device disposed in said main conduits between said brake fluid pressure producing source and said pump device which is operative between an open state and a closed state and, when switched to said closed state, said second valve device holds a brake fluid pressure on a side of said pump device higher than a brake fluid pressure on a side of said brake fluid pressure producing source when the brake fluid is supplied through any of said first and second conduits via said pump device to said main conduits.

5. A brake system according to claim 4, further comprising:
an accelerating slip detecting device for detecting a need for braking control of said wheels and generating an accelerating slip control signal for supplying more brake fluid to said wheel braking force producing devices corresponding to said driving wheels from said brake fluid pressure producing source,
wherein said pump device is disposed in said main conduit connecting to said wheel braking force producing devices not corresponding to said driving wheels, and said braking control device, upon receipt of said accelerating slip control signal when brake fluid pressure of siad brake fluid pressure producing source is not produced, opens said first valve device and said second value device to supply brake fluid from said reservoir through said first conduit via said pump device and said second valve to said brake fluid pressure producing source so that brake fluid pressure in said brake fluid pressure producing source may be produced for supplying brake fluid to said wheel braking force producing devices corresponding to said driving wheels.

6. A brake system comprising:
a brake pedal operated by a driver;
a brake fluid pressure producing source which has two chambers that are a first chamber and a second chamber and receives an operating force to said brake pedal and producing a brake fluid pressure in correspondence to said operating force;
a reservoir for receiving excess brake fluid of said brake fluid pressure producing source through an orifice;
first and second wheel cylinders for receiving a brake fluid pressure from said brake fluid pressure producing source and producing wheel cylinder pressures;
a first conduit connecting said first chamber and said first wheel cylinder;
a second conduit for connecting said second chamber and said second wheel cylinder; and
a pump for supplying brake fluid to said brake fluid pressure producing source,
wherein said orifice has first and second orifices respectively provided in a passage connecting said first chamber and said reservoir and a passage connecting said second chamber and said reservoir, and
brake fluid delivered by said pump is supplied to said first chamber and a first brake fluid pressure in said first chamber is regulated on the basis of brake fluid supplied by said pump.

7. A brake system according to claim 6, wherein a second brake fluid pressure equal to said first brake fluid pressure is produced in said second chamber when said first brake fluid pressure occurs in said first chamber and on the basis of this second brake fluid pressure a brake fluid pressure is produced in said second wheel cylinder through said second conduit.

8. A brake system according to claim 6, wherein when said first brake fluid pressure is low with respect to a pedal operating force with which said driver operates the brake pedal, said first orifice becomes closed-state and when said first brake fluid pressure is high with respect to said pedal operating force, said first orifice becomes open-state, whereby said first brake fluid pressure is regulated in correspondence to said pedal operating force.

9. A brake system according to claim 6, further comprising a pressure detecting device for detecting a brake fluid pressure in said brake fluid pressure producing source,
wherein on the basis of a brake fluid pressure detected by said pressure detecting device an amount of brake fluid supplied to said first chamber is controlled by said first valve device duty-controlled.

10. A brake system for a vehicle comprising:
first and second wheel cylinders disposed in wheels so as to respectively produce wheel braking forces in the wheels;
a first hydraulic chamber for force-feeding a hydraulic pressure to said first wheel cylinder;
a second hydraulic chamber for force-feeding a hydraulic pressure to said second wheel cylinder,
a reservoir provided for supplying brake fluid to both said first hydraulic chamber and said second hydraulic chamber and receiving excess brake fluid in said first and second hydraulic chambers;
first and second passages respectively disposed so as to connect said reservoir and said first and second hydraulic chambers, which have conduit diameters smaller than conduit diameters of a first conduit connecting said first hydraulic chamber and said first wheel cylinder and a second conduit connecting said first hydraulic chamber and said second wheel cylinder respectively, thereby exhibiting an orifice effect when brake fluid flows from said first hydraulic chamber and said second hydraulic chamber to said reservoir; and
a brake fluid supplying device for forcibly supplying brake fluid into said first conduit and/or second conduit in addition to a brake fluid amount having flowed into said first and second wheel cylinders from said first hydraulic chamber and second hydraulic chamber,
wherein when brake fluid is forcibly supplied into at least one of said first and second conduits by said brake fluid supplying device this forcibly supplied brake fluid flows into said first and/or second hydraulic chamber and by said orifice effect a brake fluid pressure is produced in said first and/or second hydraulic chamber, and first and second movable pistons forming said first and second hydraulic chambers are joined by an elastic member and thereby the brake fluid pressures in said first hydraulic chamber and second hydraulic chamber are made substantially equal.

11. A brake system according to claim 10, wherein said brake fluid supplying device is driven in response to starting of automatic braking control.

12. A brake system comprising:

a brake pedal step-operated by a driver;

a master cylinder producing a master cylinder pressure on the basis of step-operation of said brake pedal;

a primary chamber disposed in said master cylinder and formed on said brake pedal side;

a secondary chamber disposed in said master cylinder liquidtightly with respect to said primary chamber and disposed on an end wall side of said master cylinder;

a first conduit for supplying brake fluid from said primary chamber to a first brake piping system;

a second conduit for supplying brake fluid from said secondary chamber to a second brake piping system;

a master reservoir for conducting supplying of brake fluid to said primary chamber and secondary chamber and receiving of excess brake fluid from said primary chamber and secondary chamber;

first and second passages respectively disposed so as to connect said master reservoir and said primary chamber and said secondary chamber, formed with a diameter smaller than conduit diameters of said first conduit and said second conduit, and thereby exhibiting an orifice effect when brake fluid flows from said primary chamber and said secondary chamber to said master reservoir;

a pump for supplying brake fluid to said first brake piping system including said primary chamber; and a control device for driving said pump when a state of stepping on said brake pedal is detected.

13. A brake system according to claim 12, wherein said pump has a drawing conduit constructed so that it draws brake fluid from said master reservoir, and a valve for opening and closing this drawing conduit is disposed in said drawing conduit and said control device makes said valve open-state from its closed state when said state of braking of the vehicle is detected.

14. A brake system characterized in that during automatic braking when a brake operation has not been carried out by a driver brake fluid is supplied by a pump to a first chamber inside a master cylinder and a master piston disposed in said master cylinder is moved and a brake fluid pressure is produced in a second chamber inside said master cylinder, and when a brake fluid pressure corresponding with a brake operation of the driver is produced in said master cylinder and wheel braking forces are produced in wheels, brake fluid is drawn by a pump from an area other than inside said master cylinder and delivered to at least one of said first and second chambers, and a regulating action is carried out in said master cylinder so that a brake fluid pressure inside the master cylinder produced by this delivery of brake fluid and said braking operation of the driver balance, and so as to make brake fluid pressures of said first chamber and second chamber substantially equal, and wheel braking forces are produced in the wheels on the basis of a brake fluid pressure thus regulated.

15. A brake system comprising:

a brake fluid pressure producing source for producing a brake fluid pressure in each of two chambers that are a primary chamber and a secondary chamber on the basis of a braking operation of a driver;

first and second wheel braking force producing devices for producing braking forces in wheels by using said brake fluid pressures;

a first conduit for receiving the brake fluid pressure produced in said primary chamber and supplying brake fluid to said first wheel braking force producing device;

a second conduit for receiving the brake fluid pressure produced in said secondary chamber and supplying brake fluid to said second wheel braking force producing device;

a first pressure increase control valve disposed in said first conduit for carrying out supply control of brake fluid to said first wheel braking force producing device;

a second pressure increase control valve disposed in said second conduit for carrying out supply control of brake fluid to said second wheel braking force producing device;

a reservoir for holding brake fluid;

a third conduit having a pump device for drawing brake fluid from said reservoir and delivering this drawn brake fluid to said first conduit;

a connecting passage for connecting said reservoir and said primary chamber; and a connection control valve for controlling the open/closed state of said connecting passage, wherein when a sideslip state of a vehicle is detected said pump device is driven and said first and second pressure increase control valves are controlled selectively between open and closed states and brake fluid is supplied to said first and second wheel braking force producing devices corresponding to a wheel for brake fluid pressure to be controlled according to the sideslip state and sideslip prevention control is thereby carried out to adjust the braking force of said wheel for brake fluid pressure to be controlled, and when the braking force of said wheel for brake fluid pressure to be controlled is produced by said first wheel braking force producing device said second pressure increase control valves are made closed-state and brake fluid is supplied to said first wheel braking force producing device and when the braking force of said wheel to be controlled is produced by said second wheel braking force producing device said connection control valve and said first pressure increase control valves are made closed-state and brake fluid is supplied to said second wheel braking force producing device.

16. A brake system according to claim 15, further comprising a pressure detecting device for detecting a brake fluid pressure in at least one of said first conduit and said second conduit, wherein when brake fluid pressure detected by said pressure detecting device is higher than a pressure during sideslip prevention control, it is considered to be a time of vehicle braking and a braking force is produced in said wheel to be controlled on the basis of a brake fluid pressure in said brake fluid pressure producing device increased according to a braking operation of said driver.

17. A brake system comprising
a brake fluid pressure producing source;
a reservoir which holds brake fluid;
a plurality of wheel braking force producing devices;
a plurality of main conduits connecting said brake fluid pressure producing source and each of said wheel braking force producing devices;
a braking control detection device which detects a need for braking control and produces a control signal to control the supply of brake fluid from said brake fluid pressure producing source to one of said wheel braking force producing devices;
a pump device connected to said main conduits;
a first conduit connecting said reservoir and said pump device;
a second conduit connecting said brake fluid pressure producing source and said pump separately from said main conduits;
a first valve device positioned within said first conduit which controls the opening and closing of said first conduit; and
a braking control device which opens said first valve device and makes operative said pump device to supply brake fluid through said first conduit to said one of said wheel braking force producing devices upon receipt of said control signal when the brake fluid pressure of said brake fluid pressure producing source is below a predetermined level, said braking control device closing said first valve device and making operatives said pump device to supply brake fluid through said second conduit from said brake fluid pressure producing source upon receipt of said control signal when a brake fluid pressure of said brake fluid pressure producing source is above a predetermined value.

* * * * *